US012668674B2

(12) United States Patent
Abidi

(10) Patent No.: US 12,668,674 B2
(45) Date of Patent: Jun. 30, 2026

(54) METHOD OF MAKING CELLULOSE BIOPLASTICS

(71) Applicant: Texas Tech University System, Lubbock, TX (US)

(72) Inventor: Noureddine Abidi, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 793 days.

(21) Appl. No.: 17/928,697

(22) PCT Filed: May 20, 2021

(86) PCT No.: PCT/US2021/033301
§ 371 (c)(1),
(2) Date: Nov. 30, 2022

(87) PCT Pub. No.: WO2021/247245
PCT Pub. Date: Dec. 9, 2021

(65) Prior Publication Data
US 2023/0235136 A1     Jul. 27, 2023

Related U.S. Application Data

(60) Provisional application No. 63/033,084, filed on Jun. 1, 2020.

(51) Int. Cl.
| | |
|---|---|
| *C08J 5/00* | (2006.01) |
| *C08B 16/00* | (2006.01) |
| *C08J 3/18* | (2006.01) |
| *C08J 5/18* | (2006.01) |
| *C08J 7/14* | (2006.01) |

(52) U.S. Cl.
CPC ................. *C08J 5/18* (2013.01); *C08B 16/00* (2013.01); *C08J 3/18* (2013.01); *C08J 7/14* (2013.01); *C08J 2301/02* (2013.01)

(58) Field of Classification Search
None
See application file for complete search history.

(56) References Cited

U.S. PATENT DOCUMENTS

| | | | |
|---|---|---|---|
| 3,168,409 A | 2/1965 | Wellisch | |
| 2016/0130370 A1* | 5/2016 | Meredith, III | ........... C08L 5/08 428/401 |
| 2017/0140848 A1 | 5/2017 | Abidi et al. | |

FOREIGN PATENT DOCUMENTS

| | | | |
|---|---|---|---|
| CN | 103965519 A | * | 8/2014 |
| CN | 103965519 B | | 5/2016 |
| WO | 2019/143802 A1 | | 7/2019 |

OTHER PUBLICATIONS

CN-103965519-A- English translation (Year: 2014).*
(Continued)

*Primary Examiner* — Stefanie J Cohen
(74) *Attorney, Agent, or Firm* — Edwin S. Flores; Daniel J. Chalker; Chalker Flores, LLP

(57)     ABSTRACT
The present invention includes a bioplastic and a method of making a bioplastic comprising the steps of: dissolving a low quality cellulose biomass in a solvent, wherein low quality is defined as having little to no textile value; regenerating cellulose fibers by removing the solvent; plasticizing the cellulose fibers in the presence of a polyol into a plasticized film; and hot pressing the plasticized film into the bioplastic.

14 Claims, 25 Drawing Sheets

Day 0     Day 14     Day 28     Day 42     Day 72

Day 102     Day 132     Day 162     Day 192

(56)          References Cited

OTHER PUBLICATIONS

Adak et al, A comparative study on lyocell-fabric based all-cellulose composite laminates produced by different processes, cellulose, 24:835-849 (Year: 2017).*

Acharya S. et al. (2017) Preparation and characterization of transparent cellulose films using an improved cellulose dissolution process. J Applied Polymer Science 134 (21).

Baldwin AK et al. (2016) Plastic Debris in 29 Great Lakes Tributaries: Relations to Watershed Attributes and Hydrology. Environ Sci Technol 50 (19):10377-10385. doi:10.1021/acs.est.6b02917.

Barnes DK et al. (2009) Accumulation and fragmentation of plastic debris in global environments. Philos Trans R Soc Lond B Biol Sci 364 (1526):1985-1998. doi:10.1098/rstb.2008.0205.

Cabrales et al., Microwave plasma induced grafting of oleic acid on cotton fabric surfaces, Applied Surface Science, vol. 258, Jan. 13, 2012, pp. 4636-4641.

Di Gioia L et al. (1999) Corn protein-based thermoplastic resins: effect of some polar and amphiphilic plasticizers. J Agric Food Chem 47 (3):1254-1261. doi:10.1021/jf980976j.

Free CM et al. (2014) High-levels of microplastic pollution in a large, remote, mountain lake. Mar Pollut Bull 85 (1):156-163. doi:10.1016/j.marpolbul.2014.06.001.

Geyer R. et al. (2017) Production, use, and fate of all plastics ever made. Sci Adv 3 (7):e1700782. doi:10.1126/sciadv.1700782.

Hernandez E. et al. (2017) Polyester Textiles as a Source of Microplastics from Households: A Mechanistic Study to Understand Microfiber Release During Washing. Environ Sci Technol 51 (12):7036-7046. doi:10.1021/acs.est.7b01750.

Hirai H. et al. (2011) Organic micropollutants in marine plastics debris from the open ocean and remote and urban peaches. Mar Pollut Bull 62 (8):1683-1692. doi:10.1016/j.marpolbul.2011.06.004.

Hu Y. et al. (2016) Distinct Chiral Nematic Self-Assembling Behavior Caused by Different Size-Unified Cellulose Nanocrystals via a Multistage Separation. Langmuir 32 (38):9863-9872. doi:10.1021/acs.langmuir.6b02861.

International Search Report and Written Opinion, [ISA/US] PCT/US2021/033301 dated Aug. 24, 2021.

Kafy A. et al. (2015) Designing flexible energy and memory storage materials using cellulose modified graphene oxide nanocomposites. Phys Chem Chem Phys 17:5923-5931.

Kafy A. et al. (2017) Porous cellulose/graphene oxide nanocomposite as flexible and renewable electrode material for supercapacitor. Synthetic Met 223:94-100.

Ko Y. et al. (2017) Flexible supercapacitor electrodes based on real metal-like cellulose papers. Nat Commun 8 (1):536. doi:10.1038/s41467-017-00550-3.

Ling SD et al. (2017) Ubiquity of microplastics in coastal seafloor sediments. Mar Pollut Bull 121 (1-2):104-110. doi:10.1016/j.marpolbul.2017.05.038.

Miller RZ et al. (2017) Mountains to the sea: River study of plastic and non-plastic microfiber pollution in the northeast USA. Mar Pollut Bull 124 (1):245-251. doi:10.1016/j.marpolbul.2017.07.028.

Palchoudhury S. et al. (2019) Flexible supercapacitors: A materials perspective. frontiers in Materials 5 (83):1-9.

Park HM et al. (2004) "Green" nanocomposites from cellulose acetate bioplastic and clay: effect of eco-friendly triethyl citrate plasticizer. Biomacromolecules 5 (6):2281-2288. doi:10.1021/bm049690f.

Peelman N et al. (2013) Application of biobased materials for packing short and medium shelf life food products. Commun Agric Appl Biol Sci 78 (1):103-107.

Rillig MC (2012) Microplastic in terrestrial ecosystems and the soil? Environ Sci Technol 46 (12):6453-6454. doi:10.1021/es302011r.

Rujnic-Sokele M. et al. (2017) Challenges and opportunities of biodegradable plastics: A mini review. Waste Manag Res 35 (2):132-140. doi:10.1177/0734242X16683272.

Rumi et al., Conversion of low-quality cotton to bioplastics, vol. 28, Jan. 15, 2021 pp. 2021-2038.

Suyatma NE et al. (2005) Effects of hydrophilic plasticizers on mechanical, thermal, and surface properties of chitosan films. J Agric Food Chem 53 (10):3950-3957. doi:10.1021/jf048790+.

Thompson RC et al. (2004) Lost at sea: where is all the plastic? Science 304 (5672):838. doi:10.1126/science.1094559.

Wagner M. et al. (2014) Microplastics in freshwater ecosystems: what we know and what we need to know. Environ Sci Eur 26 (1):12. doi:10.1186/s12302-014-0012-7.

Wright SL et al. (2013) Microplastic ingestion decreases energy reserves in marine worms. Curr Biol 23 (23):R1031-1033. doi:10.1016/j.cub.2013.10.068.

Xiao C. et al. (2003) Properties of regenerated cellulose films plasticized with a-monoglycerides. J Applied Polymer Science 89 (13):3500-3503.

Yu X. et al. (2018) Occurrence and distribution of microplastics at selected coastal sites along the southeastern United States. Sci Total Environ 613-614:298-305. doi:10.1016/j.scitotenv.2017.09.100.

Peters CA et al. Urbanization is a major influence on microplastic ingestion by sunfish in the Brazos River Basin, Central Texas, USA, Environmental Pollution 210 (2016) 380-387.

* cited by examiner

FIGS. 1A-D

| Cellulose film (without glycerol treatment) | Time (s) | | |
|---|---|---|---|
| | 0 | 60 | 120 |
| Control film | | | |
| Film functionalized with 0.066 mol/l oleic acid | | | |
| Film functionalized with 0.4 mol/l oleic acid | | | |

| Cellulose film (glycerol treated) | Time (s) | | |
|---|---|---|---|
| | 0 | 60 | 120 |
| Control film | | | |
| Film functionalized with 0.066 mol/l oleic acid | | | |
| Film functionalized with 0.4 mol/l oleic acid | | | | a b a b

| Cellulose film (glycerol treated) | Time (s) | | |
|---|---|---|---|
| | 0 | 60 | 120 |
| Control film | | | |
| Film functionalized with 0.4 mol/l oleic acid | | | |
| Film functionalized with 1 mol/l oleic acid | | | |

FIG. 23

Day 0          Day 7          Day 14          Day 21          Day 28

Day 35          Day 42          Day 49          Day 56          Day 63
                                                              N/A

Mycelium

Cellulose film

METHOD OF MAKING CELLULOSE BIOPLASTICS

CROSS-REFERENCE TO RELATED APPLICATIONS

This application claims priority to and is the National Stage of International Application No. PCT/US2021/033301, filed on May 20, 2021, and claims priority of 63/033,084, filed on Jun. 1, 2020, the content of each of which is incorporated by reference herein.

TECHNICAL FIELD OF THE INVENTION

The present invention relates in general to the field of cellulose processing, and more particularly, to novel systems and methods of making cellulose bioplastics.

STATEMENT OF FEDERALLY FUNDED RESEARCH

None.

BACKGROUND OF THE INVENTION

Without limiting the scope of the invention, its background is described in connection with petroleum-based plastic.

Petroleum-based plastic materials are widely used in the construction, automotive, and aero-space sectors. Fiberglass, one of the most durable and lightweight plastic materials, was introduced in 1940. The use of petroleum-based plastic became widespread after World War II (Geyer et al. 2017). Mass production of plastics began in the 1940s (Hernandez et al. 2017). Interest in disposable plastic containers accelerated the growth of plastic globally. This resulted in an increase in the market share of plastics as well as an increase in the percentage of plastic wastes in the municipal solid wastes (Geyer et al. 2017). Annually, millions of metric tons of plastic materials are produced (Thompson et al. 2004). Significant amounts of plastic materials are disposed of in the environment as non-degradable wastes (Park et al. 2004). It is reported that more than 240 million tons of plastic materials are used annually, whereas the recovery of discarded plastic materials is very limited (Rillig 2012). If the current trend of plastic production continues, by 2050 approximately 12,000 Mt of plastic wastes will be accumulated in landfills or in the environment (Geyer et al. 2017). The most commonly used plastics are not biodegradable, since the constituent monomers of these plastics are derived from fossil hydrocarbons, such as ethylene and propylene. This results in accumulation of plastics in landfills or in the environment. Only destructive thermal treatment, such as combustion or pyrolysis, can permanently eliminate plastic wastes (Geyer et al. 2017). Plastic waste management through incineration is associated with negative impacts, releasing greenhouse gases into the atmosphere (Park et al. 2004).

The accumulation of non-degradable petroleum-based plastics in the environment is an issue of growing concerns. Plastic marine litter has reached a critical point (Peters and Bratton 2016). This marine litter originates from inland sources and is then naturally transported to rivers and oceans of the world. Marine litter is further spread by winds and currents (Geyer et al. 2017; Free et al. 2014). Plastic wastes are also shredded intentionally into small fragments and then discarded. Their presence is so extensive that they can be found in all major ocean basins and remote island shores (Barnes et al. 2009). The presence of plastic wastes is so ubiquitous that it has been found both in freshwater and deep ocean environment (Hirai et al. 2011; Wagner et al. 2014; Rillig 2012). Recently, the impact of small broken plastic particles, which are termed microplastics has become a growing focus for environmental concerns (Wright et al. 2013).

Microplastics are causing widespread problems because of two primary reasons: (1) Biota can easily take in small plastic particles putting them in the food chain and, (2) Microplastic particles can become enriched with pollutants by absorbing them onto their surface. Plastics themselves pose chemical hazards. They have an affinity for the surrounding chemical pollutants. Microplastics are relatively hydrophobic in nature and have a large surface area. Microplastic properties allow them to adsorb persistent organic pollutants. Plastic materials, composed of low-density polyethylene, high-density polyethylene, and polypropylene can accumulate more hazardous chemicals onto microplastics which can then be ingested by marine animals. The presence of a higher concentration of organic micropollutants, polycyclic aromatic hydrocarbons and polychlorinated biphenyls has also been detected in plastic fragments. Leaching of monomers, additives, and adsorbed pollutants out of plastics, result in many negative consequences for the environment.

Recent study conducted in 29 Great Lakes tributaries, found the presence of plastic in each of 107 samples with a concentration ranging from 0.05 to 32 particles/$m^3$ (Baldwin et al. 2016). Baldwin et al. reported that 98% of particles were in the range of microplastic size, among that 72% were in the smallest size range between 0.355 mm and 0.99 mm. The most dominant type of plastic particle was fibers, found in 71% of the samples (Baldwin et al. 2016). Ling et al. assessed the concentration of plastic debris in marine sediment samples from 42 coastal and estuarine sites and published similar results (Ling et al. 2017). They detected microplastics in all sediment samples, whereas 84% of debris were filaments, in the range of 0.038 mm to 0.250 mm in size. Miller et al. reported the presence of anthropogenic microfibers throughout the Hudson River, even in remote locations (Miller et al. 2017). From their investigation, they demonstrated that there could have been a flow of 200 million to 800 million fibers through the Hudson River every day in June 2016. Yu et al. observed the presence of microplastic of different shapes in sand samples collected from multiple coastal sites of the United States (Yu et al. 2018). They reported fibrous microplastic as the predominant type.

The growing environmental concerns regarding the accumulation of microplastics from synthetic fibers and materials led to an urgent need to find alternatives to petroleum-based products (fibers such as polyester, nylon, films, plastics, disposable materials, etc.). These petroleum-based products are notorious for their persistence because they are not biodegradable when disposed of in landfills. They have the tendency to accumulate rather than decompose and their kinetic of degradation or decomposition, either by means of mechanical degradation or photo-oxidation, is very long. For example, it has been reported that the biodegradation rate of cellulosic fibers (microcrystalline cellulose and cotton) is high. However, petroleum-based materials (e.g. polyester) are not biodegradable. Therefore, from environmental perspectives it is very important to develop materials based on cellulose (cotton in this case) which may replace petroleum-based materials. This can create a new niche-market for low-grade cotton fibers (low micronaire fibers).

Bioplastics are a safer alternative to petroleum-based plastics. Bioplastics are obtained from renewable biomass sources including vegetable fats and oils, starch, cellulose etc. Bioplastics are largely biodegradable, but not all bioplastics are biodegradable. Biodegradability of plastic depends on the raw material, the chemical structure of the polymer, the structure of the final product as well as on the environment. Bioplastics are divided into two classes: 1) biobased plastic and 2) biodegradable plastic. Plastics should meet specific criteria to be considered as biodegradable. Biodegradable plastics offer obvious advantages considering energy consumption, waste production and greenhouse gas emission during their life cycle (Rujnic-Sokele and Pilipovic 2017). According to ASTM (American Society of Testing and Materials) and ISO (International Organization for Standardization), a significant change occurs in the chemical structure of biodegradable plastics under certain environmental conditions that results in a loss of mechanical and physical properties. Microorganisms such as fungi, bacteria, and algae cause degradation to bioplastics. The biodegradation process leads to $CO_2$ and $H_2O$ as end-products along with organic materials. The released amount of $CO_2$ by plant is significantly lower than the consumed amount during its life cycle. Blending biomass with biodegradable polymers can make the resulting biobased plastic biodegradable. Biodegradable polymers undergo microbial induced chain scission that can alter the polymer leading to photodegradation, mineralization, hydrolysis, and oxidation.

Natural fiber based bioplastic materials have a wide range of application including construction, automotive, aerospace, sports, and leisure industries. Specific uses of bioplastic materials can be in packaging trays, hat racks, instrument panels, door panels, boot liners, internal engine covers, seat back, oil/air filters and exterior underfloor paneling. The use of biomaterials as scaffolds is showing excellence for soft tissue growth. The biomedical application of green materials is distinguished from synthetic materials by their properties of biocompatibility, bioactivity, and biodegradability. Cotton cellulose has been studied for its use in biomedical applications. Hydrophilicity of cellulosic bioproducts helps interact with a hydrophilic substance and surface, such as a living cell. This biocompatibility is the most critical aspect of a biomedical application. One of the prominent applications of biomaterials is in the regeneration of damaged tissues and in implants. Biobased films are very prospective to use for food packaging. Current applications of bioplastics are available for short shelf life products (fresh foods) and long shelf life products (products with requirements of oxygen and water barrier properties that are not high). However, a wide variety of properties of bioplastic film offers potential application for food products (Peelman et al. 2013).

Although there is a wide range of bioplastics, only a few are commercially produced. There is a great increase in the consumption of bioplastics (15,000 tons to 22,5000 tons) worldwide. However, the current share of the bioplastic market is only 5 to 10% of the total plastic market. The capacity of bioplastic production worldwide is only 300,000 tons annually. In order to expand the bioplastic market into other markets, such as consumer goods and commercial constructions, the quality and performance of bioplastic materials need to be improved.

What is needed are novel methods of cellulose processing, and more particularly, to novel systems and methods of making cellulose bioplastics.

SUMMARY OF THE INVENTION

In one embodiment, the present invention includes a method of making a bioplastic comprising the steps of: dissolving a low quality cellulose biomass in a solvent, wherein low quality is defined as having little to no textile value; regenerating cellulose fibers by removing the solvent; plasticizing the cellulose fibers in the presence of a polyol into a plasticized film; and hot pressing the plasticized film into the bioplastic. In one aspect, the cellulose is derived from cotton, wood, hemp, bacterial cellulose, microbial cellulose, tunicate, algae, or grass cellulose. In another aspect, the low quality cellulose is a low quality cotton cellulose that has one or more of the following values: (1) micronaire equal to or less than 2.5; length equal to or less than 1.14; uniformity equal to or less than 77%; strength g/tex equal to or less than 29; elongation equal to or less than 7%, color 31-3, or leaf equal to or less than 2. In another aspect, the method further comprises the step of at least one of: scouring or bleaching the low quality cellulose biomass prior to dissolving in the solvent. In another aspect, the solvent is an alkali metal/organic solvent selected from dimethylformamide, dimethylacetamide, tetrahydrofuran, butoxyethanol, 1-propanol, methanol, ethanol, 2-propanol, acetone, dimethylsulfoxide, urea, or sulfolane. In another aspect, an ionic salt is added to the solvent, and the ionic salt is selected from at least one of: is LiCl, NaOH, NaCl, LiF, KCl, or LiBr. In another aspect, the low quality cellulose biomass is dissolved at 0.1-2% weight to volume in the solvent. In another aspect, the step of dissolving is at a temperature of at least 100° C. degrees or higher for at least 1, 2, 3, 4, 5, 6, 7, 8, 9, 10, 11, or 12 hours. In another aspect, the polyol is glycerol, poly(vinyl chloride), poly(vinyl butyral), poly(vinyl acetate), polypropylene glycol, polyethylene glycol, ethylene glycol or sorbitol. In another aspect, the low quality cellulose biomass is dissolved in an organic solvent for a first predetermined period of time, and then an ionic salt is added for a second predetermined period of time. In another aspect, the method further comprises the step of forming the bioplastic into a film, a fiber, spun into a yarn, a matrix, a mat, a mesh, or functionalized. In another aspect, the polyol is at 10-99% volume to volume. In another aspect, the method further comprises the step of functionalizing the bioplastic with a plasma in the presence of a fatty acid, oleic acid, linoleic acid, or aliphatic compounds selected from vinyl laurate, vinyl stearate, vinyl decanoate, and vinyl valerate. In another aspect, the method further comprises the step of hydrolyzing the low quality cellulose biomass prior to the step of dissolving the low quality cellulose biomass. In another aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage. In another aspect, the bioplastic is biodegradable, partially biodegradable, or non-biodegradable in soil.

In another embodiment, the present invention includes a method a bioplastic comprising the steps of: scouring, bleaching, or both scouring and bleaching a low quality cellulose biomass; dissolving the low quality cellulose biomass scoured and/or beached in a solvent and an ionic salt, wherein low quality is defined as having little to no textile value; regenerating cellulose fibers by removing the solvent; plasticizing the cellulose fibers in the presence of a polyol into a plasticized film; and hot pressing the plasticized film into the bioplastic. In one aspect, the cellulose is cotton, wood, hemp, bacterial cellulose, microbial cellulose, tunicate, algae, or grass cellulose. In another aspect, the low quality cellulose is a low quality cotton cellulose that has one or more of the following values: (1) micronaire equal to or less than 2.5; length equal to or less than 1.14; uniformity equal to or less than 77%; strength g/tex equal to or less than 29; elongation equal to or less than 7%, color 31-3, or leaf equal to or less than 2. In another aspect, the solvent is an alkali metal/organic solvent selected from dimethylformamide, dimethylacetamide, tetrahydrofuran, butoxyethanol, 1-propanol, methanol, ethanol, 2-propanol, acetone, dimethylsulfoxide, urea, or sulfolane. In another aspect, the ionic salt is LiCl, NaOH, NaCl, LiF, KCl, or LiBr. In another aspect, the polyol is glycerol, poly(vinyl chloride), poly (vinyl butyral), poly(vinyl acetate), polypropylene glycol, polyethylene glycol, ethylene glycol or sorbitol. In another aspect, the low quality cellulose biomass is dissolved in an organic solvent for a first predetermined period of time, and then an ionic salt is added for a second predetermined period of time. In another aspect, the step of forming the bioplastic into a film, a fiber, spun into a yarn, a matrix, a mat, a mesh, or functionalized. In another aspect, the polyol is at 10-99% volume to volume. In another aspect, the step of functionalizing the bioplastic with a plasma in the presence of a fatty acid, oleic acid, linoleic acid, aliphatic compounds selected from vinyl laurate, vinyl stearate, vinyl decanoate, and vinyl valerate. In another aspect, the step of hydrolyzing the low quality cellulose biomass prior to the step of dissolving the low quality cellulose biomass. In another aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage. In another aspect, the bioplastic is biodegradable, partially biodegradable, or non-biodegradable in soil.

In another embodiment, the present invention includes a system for making a bioplastic, comprising: in a vessel dissolving a low quality cellulose biomass in a solvent and optionally an ionic salt, wherein low quality is defined as having little to no textile value; regenerating cellulose fibers by removing the solvent from the dissolved low quality cellulose biomass; adding a plasticizer to the regenerated cellulose fibers in the vessel to form a plasticized film; and forming the bioplastic by placing the plasticized film into a hot press. In another aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage. In another aspect, the bioplastic is biodegradable, partially biodegradable, or non-biodegradable in soil.

In another embodiment, the present invention includes a bioplastic made by the method comprising: dissolving a low quality cellulose biomass in a solvent and optionally an ionic salt, wherein low quality is defined as having little to no textile value; regenerating cellulose fibers by removing the solvent; plasticizing the cellulose fibers in the presence of a polyol into a plasticized film; and hot pressing the plasticized film into the bioplastic. In another aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage. In another aspect, the bioplastic is biodegradable, partially biodegradable, or non-biodegradable in soil.

BRIEF DESCRIPTION OF THE DRAWINGS

For a more complete understanding of the features and advantages of the present invention, reference is now made to the detailed description of the invention along with the accompanying figures and in which:

FIGS. 1A to 1D show polarized light microscopic images of 1% cotton fiber in DMAc/LiCl (a) before placing the solution inside the oven at 105° C.; (b) after keeping the solution inside the oven for 6 h at 105° C.; (c) after keeping the solution inside the oven for 9 h at 105° C.; (d) after keeping the solution inside the oven for 12 h at 105° C.

(FIG. 2A) 3×4 in$^2$; (FIG. 2B) 15×15 in$^2$.

(FIG. 4B) glycerol plasticized regenerated wet cellulose film; (FIG. 4C) hot pressed cellulose film.

(FIG. 8A) Deformation recovery measurement instrument; (FIG. 8B) Schematic of measuring procedure of recovery from deformation.

(FIG. 14A) films enclosed in a desiccator (75% relative humidity), (FIG. 14B) films placed on the benchtop (65±2% relative humidity).

(FIG. 17A) without glycerol treatment, (FIG. 17B) with glycerol treatment.

(FIG. 20A) films without glycerol treatment; (FIG. 20B) films with glycerol treatment.

(FIG. 21A) films without glycerol treatment, (FIG. 21B) films with glycerol treatment.

(FIG. 22A) without glycerol treatment, (FIG. 22B) with glycerol treatment.

FIG. 23: Contact angle images of water drops on cellulose films with glycerol treatment and functionalized with oleic acid of 0.4 and 1 mol/L.

DETAILED DESCRIPTION OF THE INVENTION

Figure 2A:
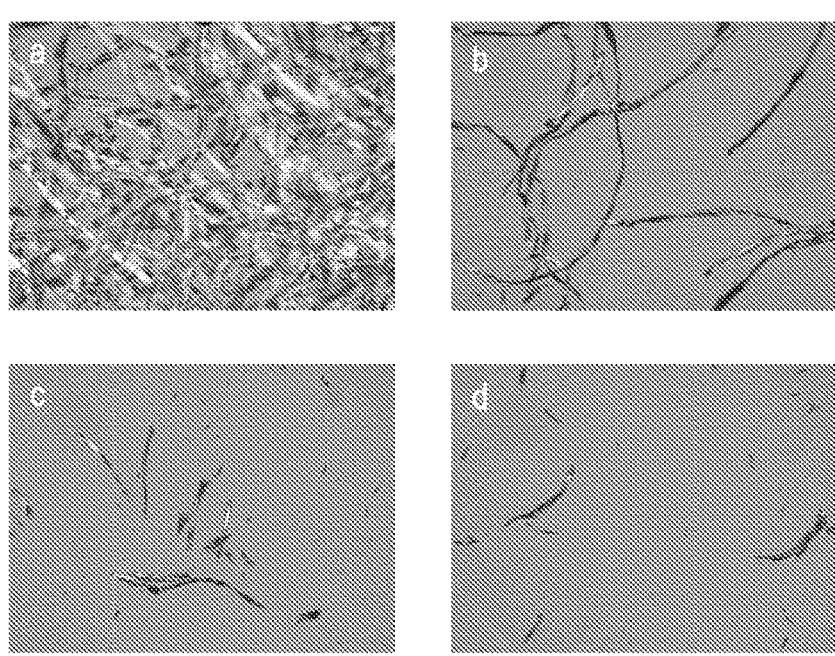
FIGS. 2A and 2B show heat press machines with different sizes.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity but include the general class of which a specific example may be used for illustration. The terminology herein is used to describe specific embodiments of the invention, but their usage does not limit the invention, except as outlined in the claims.

The present invention includes use of low-quality cellulose fibers, such as cotton cellulose, that lacks textile value as raw material to prepare bioplastic products. Although studies on bioplastics made of different biomaterials have been extensively documented, few studies focus on the direct use of low-quality cotton fiber. The conversion of this agricultural biomass (low-quality cotton fiber), could not only achieve homogenous, strong, and flexible bioplastic films but also add a high profit to cotton farmers and the cotton industry. In non-limiting examples, the bioplastics of the present invention can be used in a variety of uses and form. For example, the bioplastic can be formulated into an additive for a composite, or a bioplastic composite. The bioplastic can be formulated to replace petroleum-based plastics. The bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage.

Bioplastic films were developed by dissolving 1% cotton fiber in N, N-dimethylacetamide/lithium chloride (DMAc/LiCl), followed by regeneration, glycerol plasticization, and hot pressing. The resulting films were characterized using Fourier Transform Infrared Spectroscopy (FTIR), Scanning Electron Microscopy (SEM), X-ray Diffractometer (XRD), Thermogravimetric Analysis (TGA), tensile properties measurements, and Deformation Recovery Analysis (DRA) to evaluate their physical, chemical, and mechanical properties. The results from the material characterization suggest that although the resulting bioplastic films were amorphous with lower crystallinity, as compared to raw cotton cellulose, the physical and mechanical properties were significantly improved due to the plasticization and hot pressing. The plasticization using glycerol treatment enhances the deformation recovery capability and produces flexible bioplastic films. In addition, hot pressing reduces the surface roughness and improves the homogeneity of the bioplastic films. This study paves the way to use low-quality cotton fibers (usually sold at low price) to advanced bioproducts such as bioplastics. These materials produced from renewable sources could be a viable alternative to petroleum-based materials.

The chemical and physical structure of natural fibers, such as cotton fiber, is one of the reasons for their strength and stiffness. Cellulose is the most abundant natural polymer on the earth and cotton fiber is one of the purest sources of cellulose. Raw cotton is composed of more than 95% cellulose. Cellulose is made up of β-D-glucopyranose units. These units are linked together by 1-4 glycosidic bonds making long chains of cellulose. Each unit is rotated 180° around the molecular axis. Each anhydroglucose unit contains one primary hydroxyl group and two secondary hydroxyl groups. The reactivity of the hydroxyl group affects the chemical reactivity and the effect of heat on cellulose. Cellulose molecules are organized into crystallites in parallel arrangements followed by elementary fibrils. An elementary fibril with a diameter of about 3.5 nm is made of about 36 cellulose chains. These fibrils aggregate to form microfibrils with a diameter of 10 to 30 nm. Microfibrils subsequently are associated into large aggregates called macrofibrils with a diameter varying from 60 nm to 360 nm. Numerous intra- and intermolecular hydrogen bonds are formed between the hydrogen and oxygen molecules in cellulose. This force leads to very strong microfibrils. For crystalline cellulose, the elastic modulus and the tensile strength are 110-220 GPa and 7.5-7.7 GPa, respectively. This is comparable to Kevlar-49 fiber, for which the tensile strength is 124-130 GPa and the elastic modulus is 3.5 GPa. The rigidity of cellulose chains, the crystallinity of cellulose, and the extensive intra- and intermolecular hydrogen bonds of cellulose chains contribute to the strength of the cotton fiber.

Cellulose can be also extracted from hemp. The fiber bundles in the hemp plant come from the base layer of the stem. Mature plants are cut off and let to dry for 5 to 6 days. After removing seeds and leaves, the fiber extraction is performed using mechanical, biological, or chemical treatments. The hemp stem is composed of approximately 20-40% (by weight) of fiber located on the periphery of the stem and 60-80% (by weight) of hurds (wood). The chemical composition of the raw hemp fiber is: 55-72% cellulose, 8-19% hemicellulose, and 2-5% lignin. However, hemp hurd is lower in cellulose (36-41%) but higher in lignin (19-21%) and hemicellulose (31-37%).

Example 1. Preparation of Bioplastic Films from Cotton Cellulose

Cotton fiber. Low-quality cotton was obtained from the Fiber and Biopolymer Research Institute, Texas Tech University (Lubbock, TX, USA). The quality parameters of the raw cotton, measured by High Volume Instrument (HVI) is summarized in Table 1. It is a heavily discounted cotton with little to no textile value. Raw cotton was cleaned three times using a Microdust and Trash Monitor (MTM).

TABLE 1

| Cotton quality parameters measured by High volume Instrument (HVI). | | | | | | |
|---|---|---|---|---|---|---|
| Quality param- eter | Micro- naire | Length, in | Uniform- ity, % | Strength, g/tex | Elon- gation, % | Color Leaf |
| value | 2.4 | 1.14 | 77.3 | 29.7 | 6.9 | 31-3    2 |

Scouring and bleaching chemicals. The scouring and bleaching process is often used to remove natural impurities and color from raw cotton fibers. For the scouring treatment, sodium hydroxide (NaOH) was used to remove all non-cellulosic impurities such as dirt, fats, waxes, pectin etc. from cotton fibers. Wetting agent, Triton-X 100 was used as auxiliary additive to reduce the surface tension of water and to facilitate the penetration of water inside the fibers. Sodium hypochlorite (NaOCl), an oxidative bleaching agent, was used in order to bleach the cotton fibers. Sodium silicate ($Na_2SiO_3$) was used as a stabilizer to stabilize any metal ion present in the solution bath. Sodium carbonate ($Na_2CO_3$) and NaOH were used to maintain the proper pH (pH=11) of the solution bath and to remove dirt and dust from fibers. Furthermore, Triton-X 100, wetting agent was also used as auxiliary additive for bleaching.

DMAC/LiCl solvent system. N, N-Dimethylacetamide (DMAc or DMA) with a molecular weight of 87.12 was used as a solvent to solubilize cellulose. An ionic salt, lithium chloride (LiCl) was used to initiate solvation of cellulose in DMAc. DMAc was purchased from Acros Organics (New Jersey, USA) and LiCl was purchased from Fisher Scientific (New Jersey, USA). They were used without further purification.

Dissolution of cotton fibers. The protocol reported by Acharya et al. was used to dissolve cotton fibers in DMAC/LiCl solvent system with a slight modification (Acharya et al. 2017). Oven dried (at 105° C. for 24 h) scoured and bleached cotton fibers (1% w:v) were first suspended in 100 mL of DMAc solvent and heated for 30 min under stirring at 80° C. Next, 8 g of LiCl powder (oven-dried) was added to the cellulose suspension. The mixture was heated for another 3 h at 80° C. The temperature was decreased to 50° C. at the end of heating and was maintained overnight. Fibers were mostly undissolved in the solution. Therefore, the solution was kept inside the oven at 105° C. to accelerate cotton fiber dissolution in DMAc/LiCl solvent system. Polarized Light Microscope (Nikon Eclipse LV 100, Nikon Corporation, Tokyo, Japan) was used to observe the progression of cellulose dissolution in DMAc/LiCl solvent system at different time points. The microscope was equipped with two polarizing filters—a polarizer positioned under the sample stage and an analyzer (crossed polarizer) placed above the objectives. The micrographs of the samples were taken under ×10 magnification at ambient temperature. The sample solutions were stirred well before sampling. A drop of the sample solution was placed between a glass slide and a coverslip, which was positioned in the holder of the sample stage. Then, the sample solution was illuminated with linearly polarized light and was analyzed through the crossed polarizer. The PLM images were captured at λ=500 nm at ambient temperature with an imaging software (NIS Elements D 3.00). The solution was kept inside the oven for an additional 12 h at 105° C. in order to obtain a clear solution. The solution was sonicated for 5 min.

The dissolution of low-grade cotton fibers in DMAc/LiCl was investigated using Polarized Light Microscopy. FIGS. 1A to 1D show PLM images of the sample solution maintained at 105° C. for 6 h, 9 h, and 12 h, respectively. Those undissolved fibers gradually disappeared over time after the solution was kept at 105° C., though a few fiber snippets were visible in the solution. It is clear that the dissolution process is significantly improved. Therefore, it was found that heating at a higher temperature for a relatively long period of time is conducive to improve cellulose dissolution. As compared to cellulose dissolution at 50° C., dissolution at 105° C. for an additional 12 h significantly accelerated the dissolution rate of cotton fibers in DMAc/LiCl solvent system.

FIGS. 1A to 1D show polarized light microscopic images of 1% cotton fiber in DMAc/LiCl (FIG. 1A) before placing the solution inside the oven at 105° C.; (FIG. 1B) after keeping the solution inside the oven for 6 h at 105° C.; (FIG. 1C) after keeping the solution inside the oven for 9 h at 105° C.; (FIG. 1D) after keeping the solution inside the oven for 12 h at 105° C.

Film preparation. The cellulose solution was cast into a glass mold and was left for 1 day on the benchtop at room temperature for gelation. Films were regenerated in DI water for 5 days and DI water was exchanged every 2 h until the films were free of the solvent molecules. The thickness of the wet cellulose films was between 4.3 and 4.5 mm.

Plasticization of regenerated cellulose film. Glycerol, a polyol compound with a molecular weight of 92.0 was used in order to plasticize the regenerated cellulose films. Glycerol was purchased from Acros Organics (New Jersey, USA).

The regenerated cellulose films were plasticized with different concentration of aqueous glycerol (0%, 10%, 20%, 30%, 50%, 75%, & 99%) for 2 days. Glycerol is a widely used plasticizer for cellulosic materials (Di Gioia and Guilbert 1999). The plasticization process is useful to enhance the mechanical properties of a polymer. The addition of plasticizer improves the flexibility of a plastic film (Suyatma et al. 2005). Plasticizer reduces the rigidity of the three-dimensional structure and allows the deformation of bioplastic without rupture. It maintains the integrity of bioplastic films by preventing its cracking during its application.

Hot pressing the plasticized film. A hot press machine (Across International, New Jersey, USA) was used to press the cellulose films under specific temperature and pressure (FIGS. 2A and 2B).

The plasticized regenerated films were subjected to hot pressing at 120° C. for 15 min using a heat press machine for the stretching of the cellulose chains. Dissolution of cellulose breaks hydrogen bonds between cellulose chains. Regeneration of cellulose in deionized water allows hydrogen bonds to reform. Therefore, the molecular chains of cellulose aggregates again. Hot pressing causes the transition of the aggregated chains of cellulose in a uniform orientation. This operation stretches the cellulose chains and forms a layered dense packing structure. In addition, under a certain temperature and pressure, hot pressing causes plastic deformation of the wet cellulose films. The thickness of the resulting hot pressed cellulose films was between 0.30 mm and 0.35 mm. The whole procedure of preparing bioplastic film from raw cotton fiber is summarized in FIG. 3.

Figure 2B:
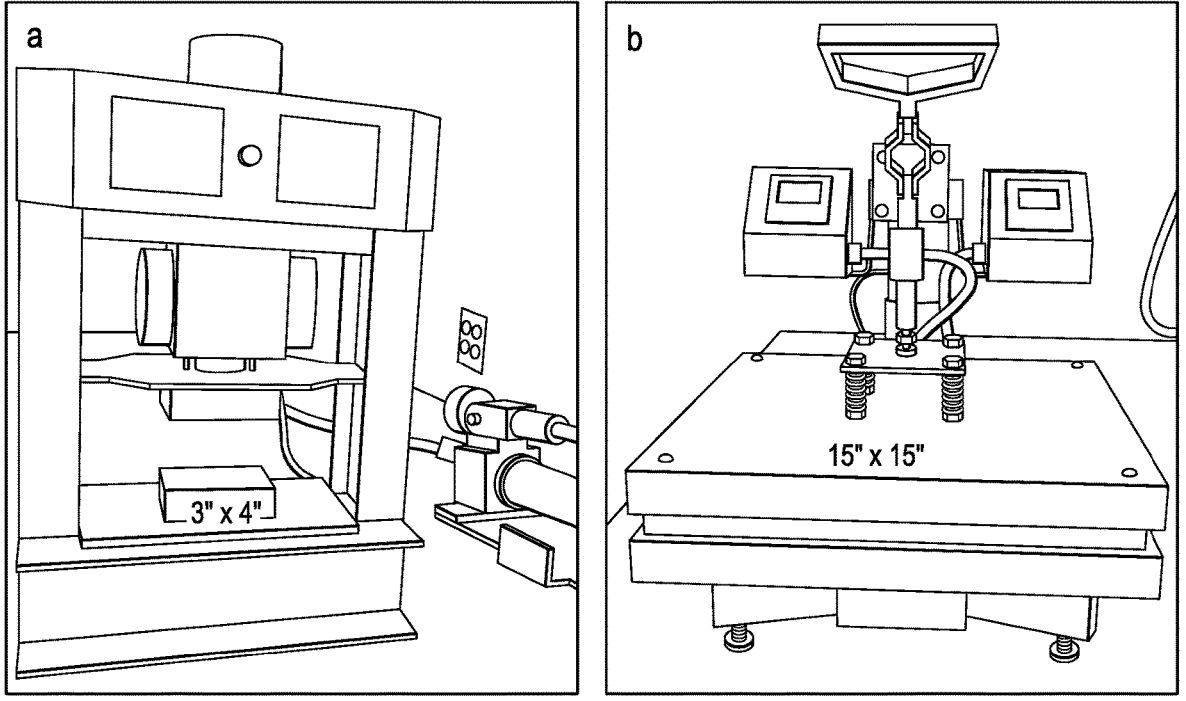
Figure 3:
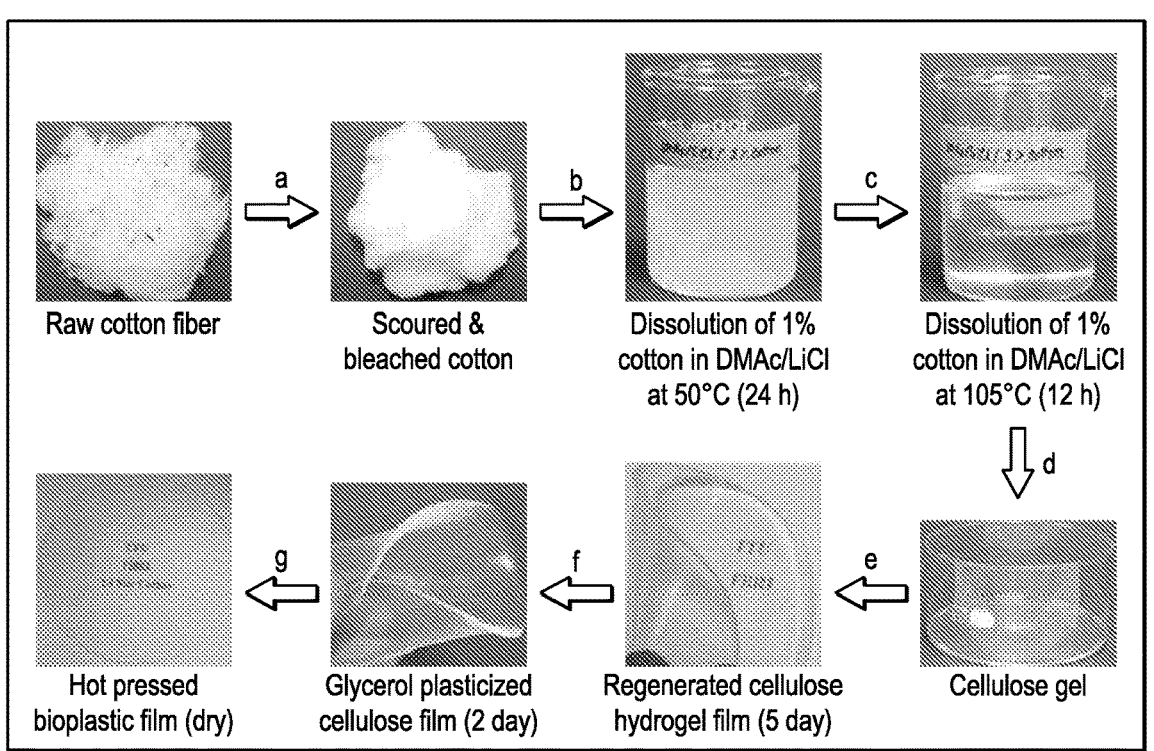
FIG. 3 shows a schematic of bioplastic film preparation process: (a) purification of cotton fibers, (b) dissolution of purified cotton in DMAc/LiCl, (c) dissolution of cotton for additional time at higher temperature, (d) solution casting, (e) regeneration of cellulose in deionized water, (f) plasticization of cellulose hydrogel with glycerol, (g) hot pressing bioplastic film at 120° C.

FIGS. 2A and 2B show heat press machines with different sizes: (FIG. 2A) $3 \times 4$ in$^2$; (FIG. 2B) $15 \times 15$ in$^2$. FIG. 3 is a schematic of bioplastic film preparation process: (a) purification of cotton fibers, (b) dissolution of purified cotton in DMAc/LiCl, (c) dissolution of cotton for additional time at higher temperature, (d) solution casting, (e) regeneration of cellulose in deionized water, (f) plasticization of cellulose hydrogel with glycerol, (g) hot pressing bioplastic film at 120° C.

Tensile testing of cotton cellulose-based films. Testing was performed to determine the tensile properties of cellulose films prepared from low-grade cotton (films shown in FIGS. 4A-C). Specimens were cut from the cellulose films according to ASTM D638 as shown in FIG. 5.

Figures 4A, 4B, 4C:
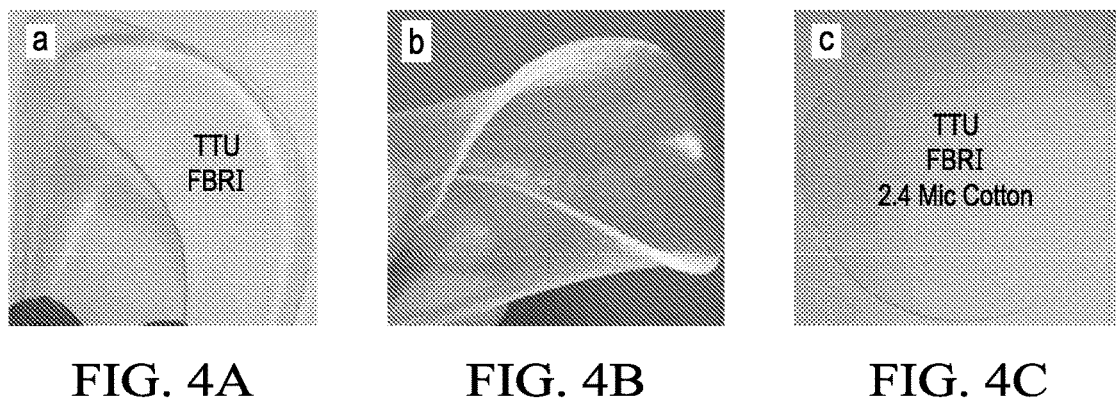
FIGS. 4A to 4C show photographs of (FIG. 4A) cellulose hydrogel after cellulose regeneration in deionized water for 5 days.
Figure 5:
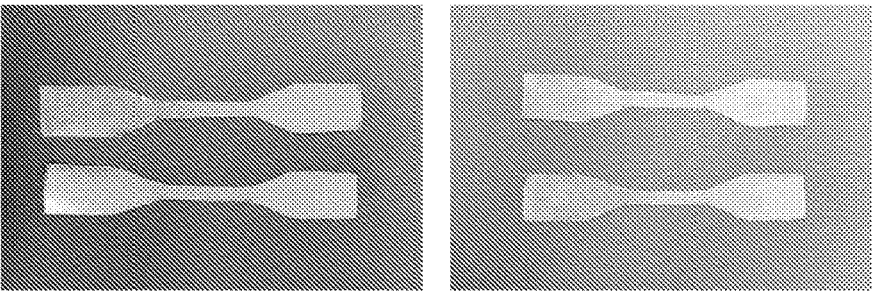
FIG. 5: Specimens cut form cellulose films shown in FIG. 4.
Figure 6:
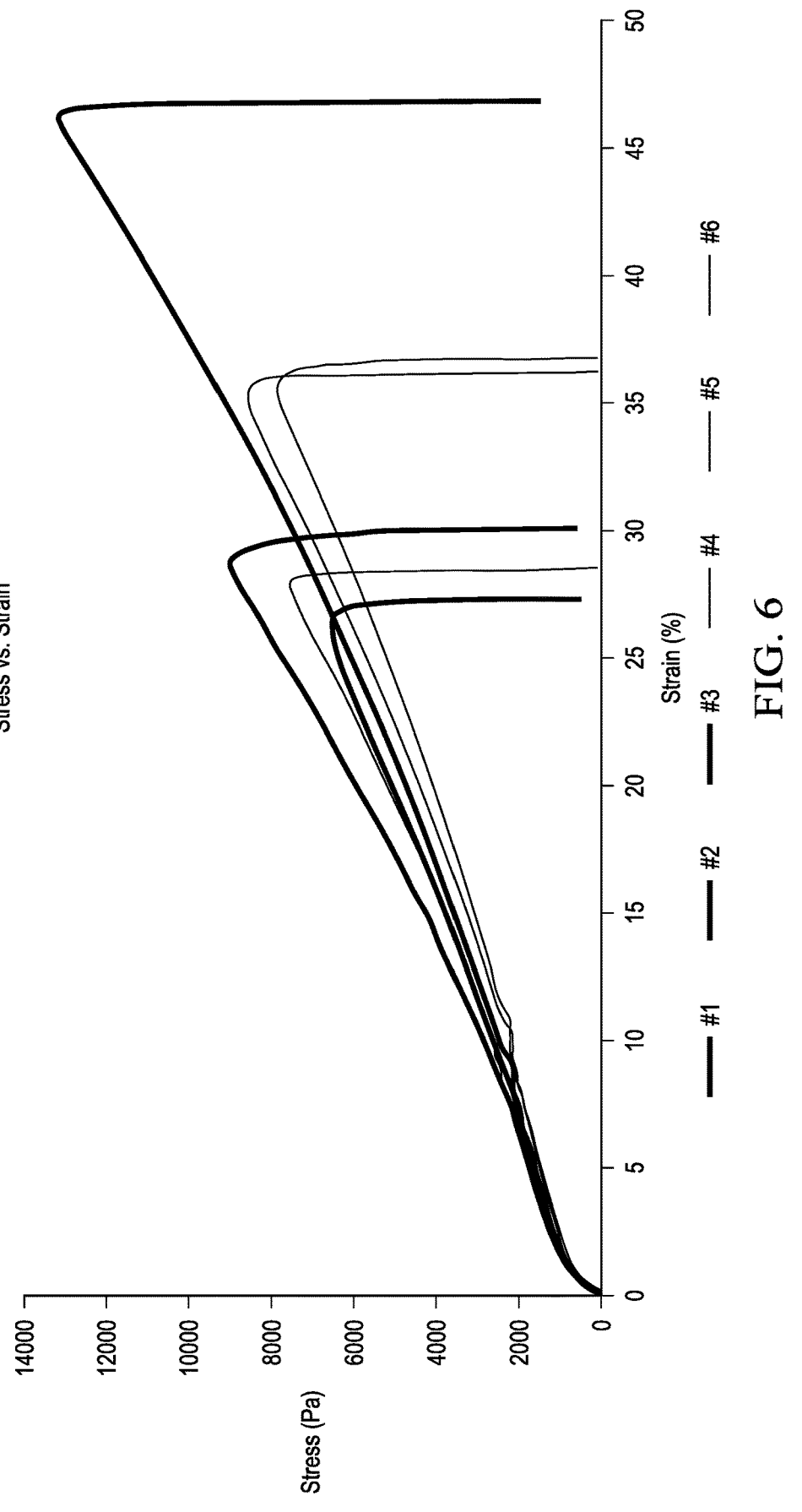
FIG. 6 is a graph that show stress vs. strain of cellulose-based films.
Figures 7A, 7B, 7C, 7D:
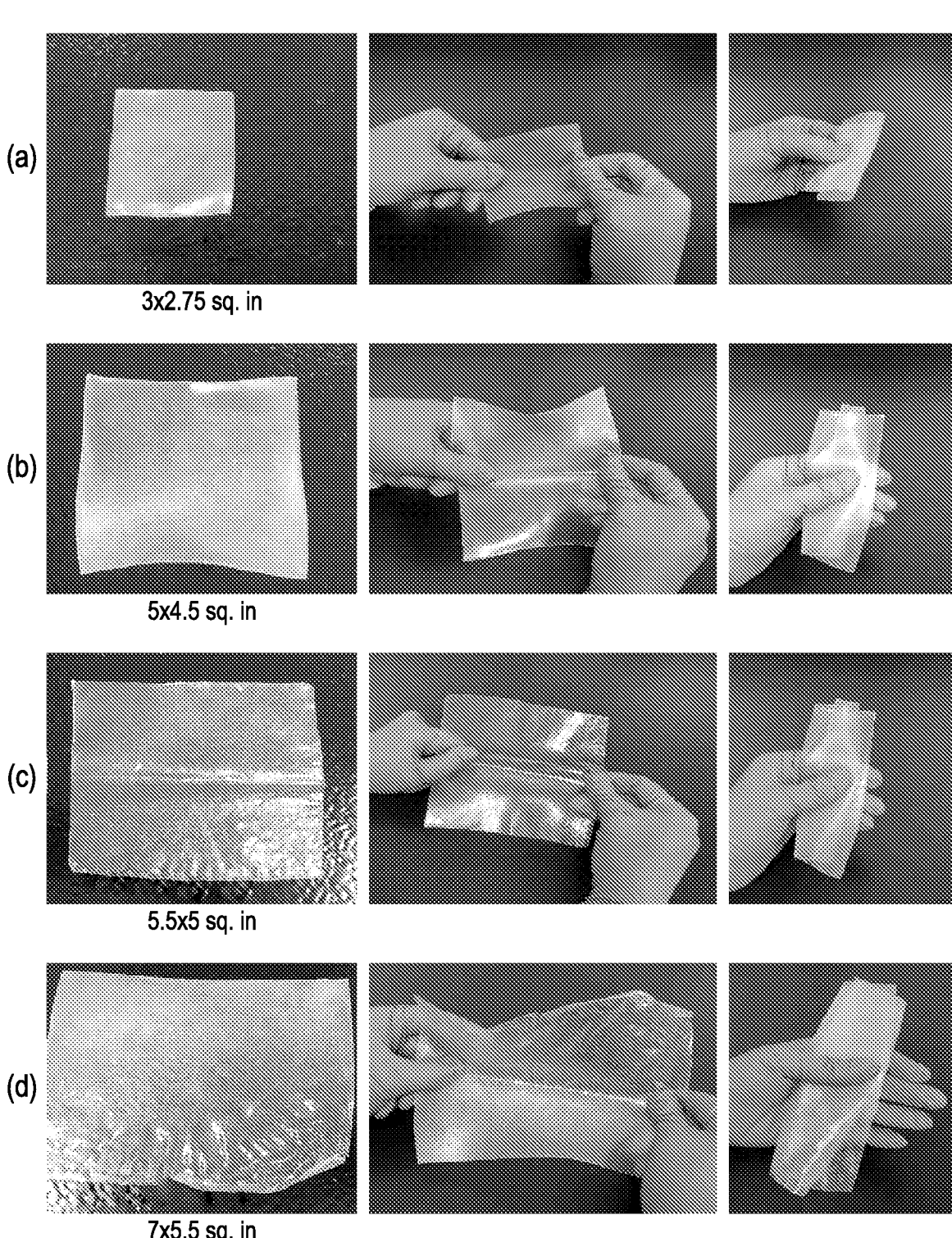
FIGS. 7A to 7D: Cellulose films with different sizes and their flexibility comparison.

FIGS. 4A to 4C: Photographs of (a) cellulose hydrogel after cellulose regeneration in deionized water for 5 days; (b) glycerol plasticized regenerated wet cellulose film; (c) hot pressed cellulose film. FIG. 5: Specimens cut form cellulose films shown in FIGS. 4A-4C. The results showed that these films exhibit very high elongation at break (between 25% and 45%) (FIG. 6). FIG. 6 is a graph that show stress vs. strain of cellulose-based films.

FIGS. 7A to 7D: Cellulose films with different sizes and their flexibility comparison. Next, films were prepared in a larger size. A hydraulic heat-press machine was used with platen size of $4 \times 3$ in$^2$ to prepare cellulose films with ~$3 \times 2.75$ in$^2$ (FIG. 2B). Comparably, larger molds and a heat press with large platen size of $15 \times 15$ in$^2$ were used to obtain cellulose films with large size. The largest size in this study obtained was ~$7 \times 5.5$ in$^2$, which is approximately 5 times larger in surface compared to the small film (FIG. 7). As shown in FIG. 7, the flexibility of larger films does not change as compared to the small-size film. This suggests that heat press with larger platen could be used to prepare films with larger size without compromising the flexibility of film.

Figures 8A, 8B:
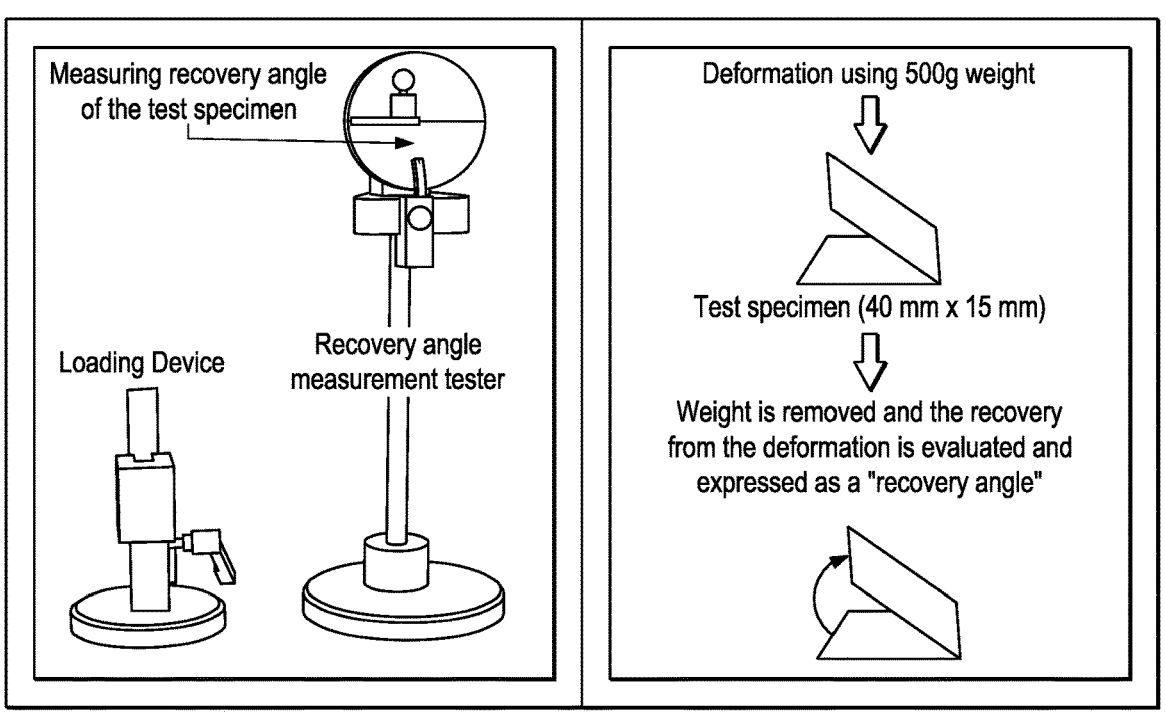
FIGS. 8A and 8B show.

FIGS. 8A and 8B show: (FIG. 8A) Deformation recovery measurement instrument; (FIG. 8B) Schematic of measuring procedure of recovery from deformation. The recovery of films from a bending deformation was carried out using a crease recovery tester instrument (James H. Heal & Co. Ltd., Halifax, England). Three replications were performed for each sample. AATCC 66-2008 test method was used to measure the recovery angle. The test specimen (40 mm×15 mm) was folded and compressed under 500±5 g-force for 5 min±5 s. The test specimen was then placed in the recovery angle measurement tester for a recovery period of 5 min±5 s and the recovery angle was recorded. Deformation recovery measurement instrument and procedure are shown in FIGS. 8A and 8B.

Figure 9:
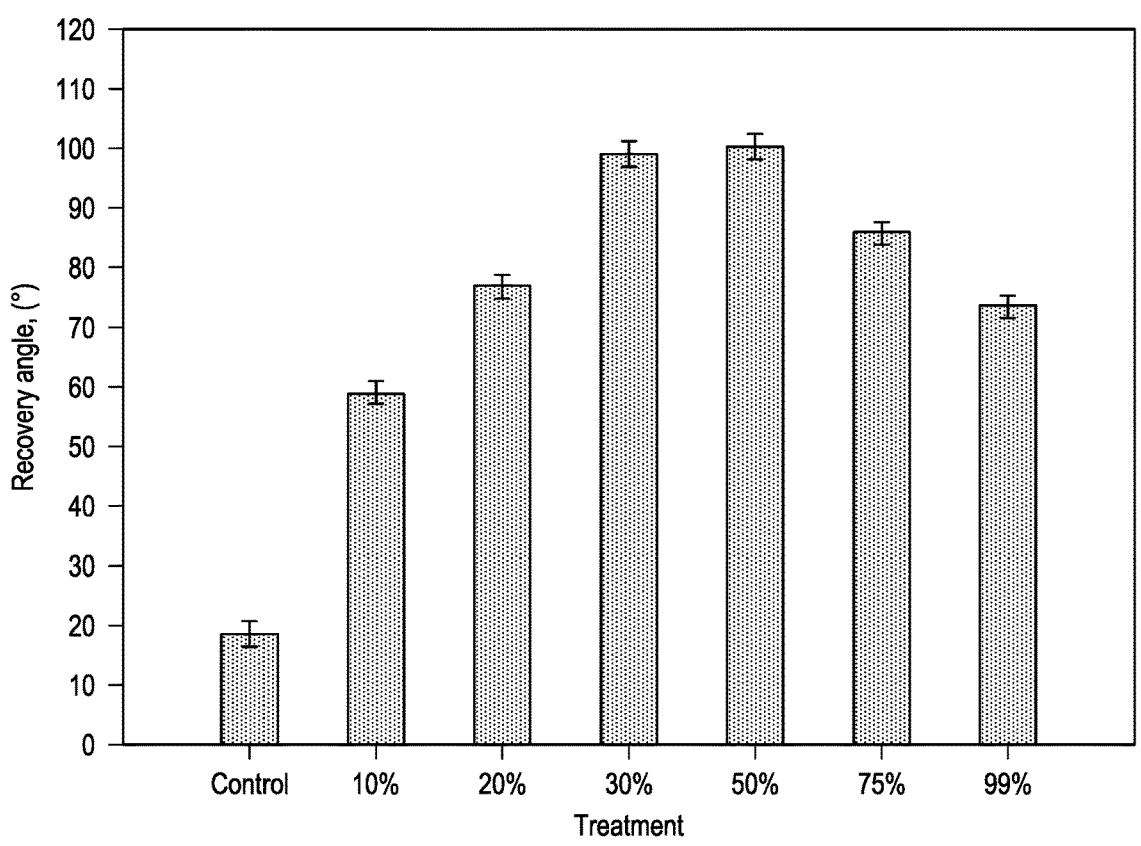
FIG. 9 is a graph that shows the recovery angle of regenerated cellulose films from deformation (p<0.05). Control represents cellulose film with no glycerol, while % indicates the % of glycerol.

FIG. 9 is a graph that shows the recovery angle of regenerated cellulose films from deformation (p<0.05). Control represents cellulose film with no glycerol, while % indicates the % of glycerol. The recovery from deformation of films is shown in FIG. 9. Glycerol helps impart flexibility to the films. The recovery capability of films from deformation increases with the increase in the amount of glycerol. However, above 50% glycerol in the solution, the films become sticky. As a result, it does not help get recovery from deformation. The addition of plasticizers forms intermolecular hydrogen bonds between plasticizers and cellulose (Xiao et al. 2003). At high concentration of plasticizer, the inter and intra-hydrogen bonds of cellulose molecules become weaker (Xiao et al. 2003; Hongphruk and Aht-Ong 2010). It may result in reduced recovery capability of cellulose films from deformation. The best recovery angle is obtained with a concentration of glycerol in the solution in the range of 30 to 50%. Although the maximum recovery angle is obtained with 50% glycerol, statistically it is not significantly different from 30% glycerol. Therefore, 30% glycerol can be used to plasticize regenerated cellulose in order to confer considerable flexibility.

Figure 10:
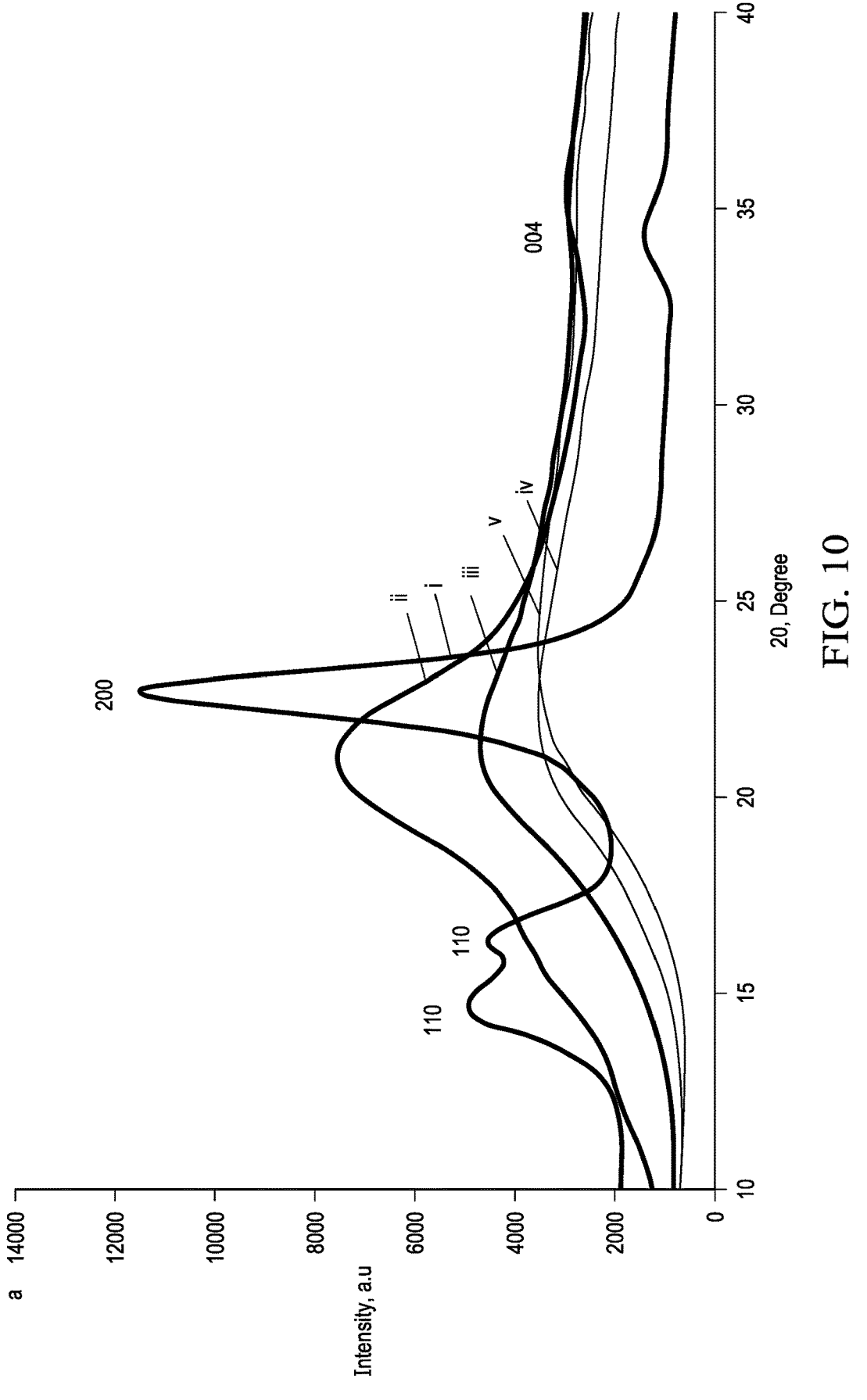
FIG. 10 is a graph that shows XRD patterns of (i) cotton cellulose and regenerated cellulose films treated with different % of glycerol: (ii) 0%, (iii) 10%, (iv) 20%, and (v) 30%.
Figure 11:
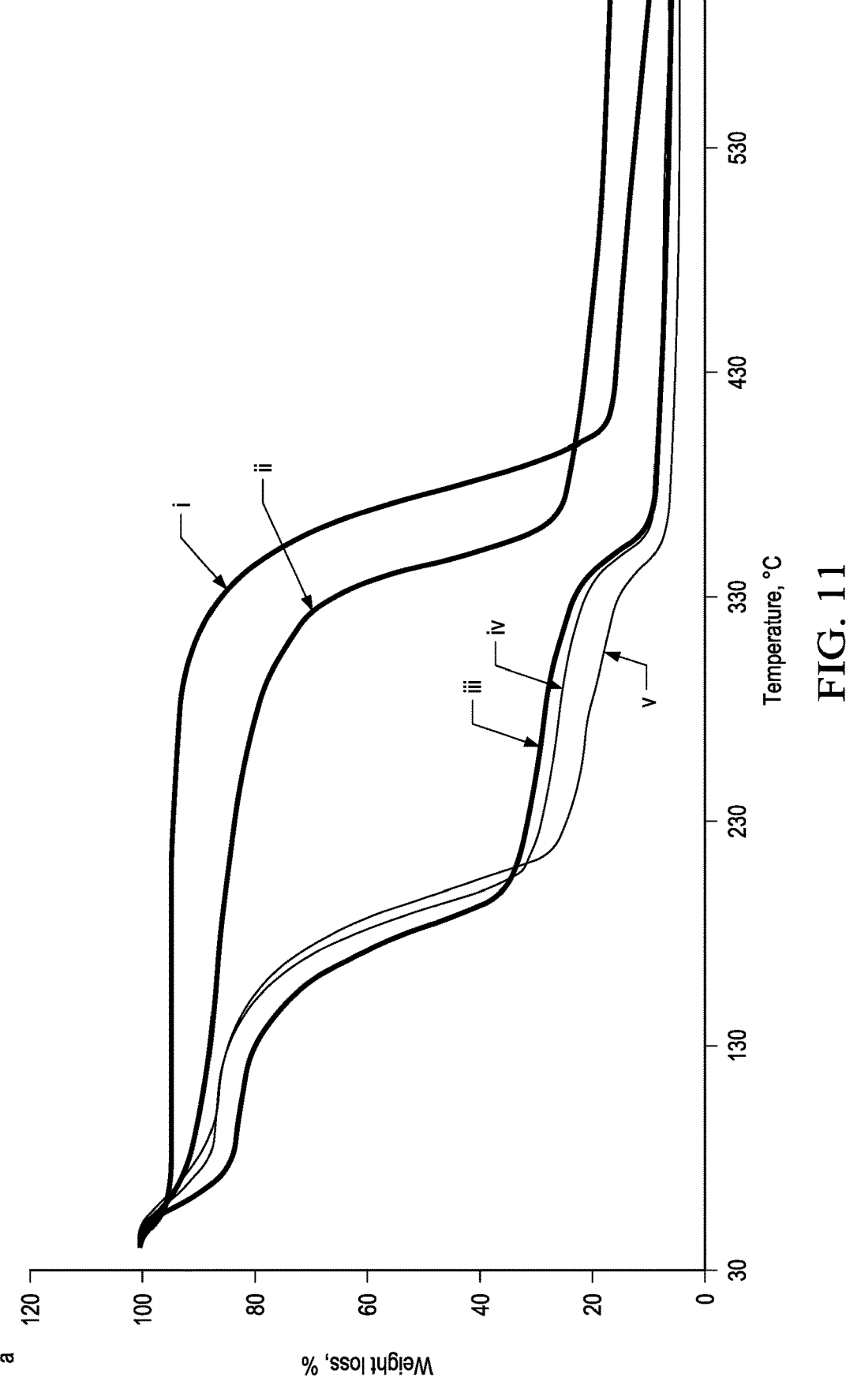
FIG. 11: TGA thermograms of cotton fiber and regenerated cellulose film treated with different % of glycerol: (a) TGA curves of (i) cotton fiber and regenerated cellulose films treated with different concentrations of glycerol: (ii) 0%, (iii) 10%, (iv) 20%, and (v) 30%.
Figure 12:
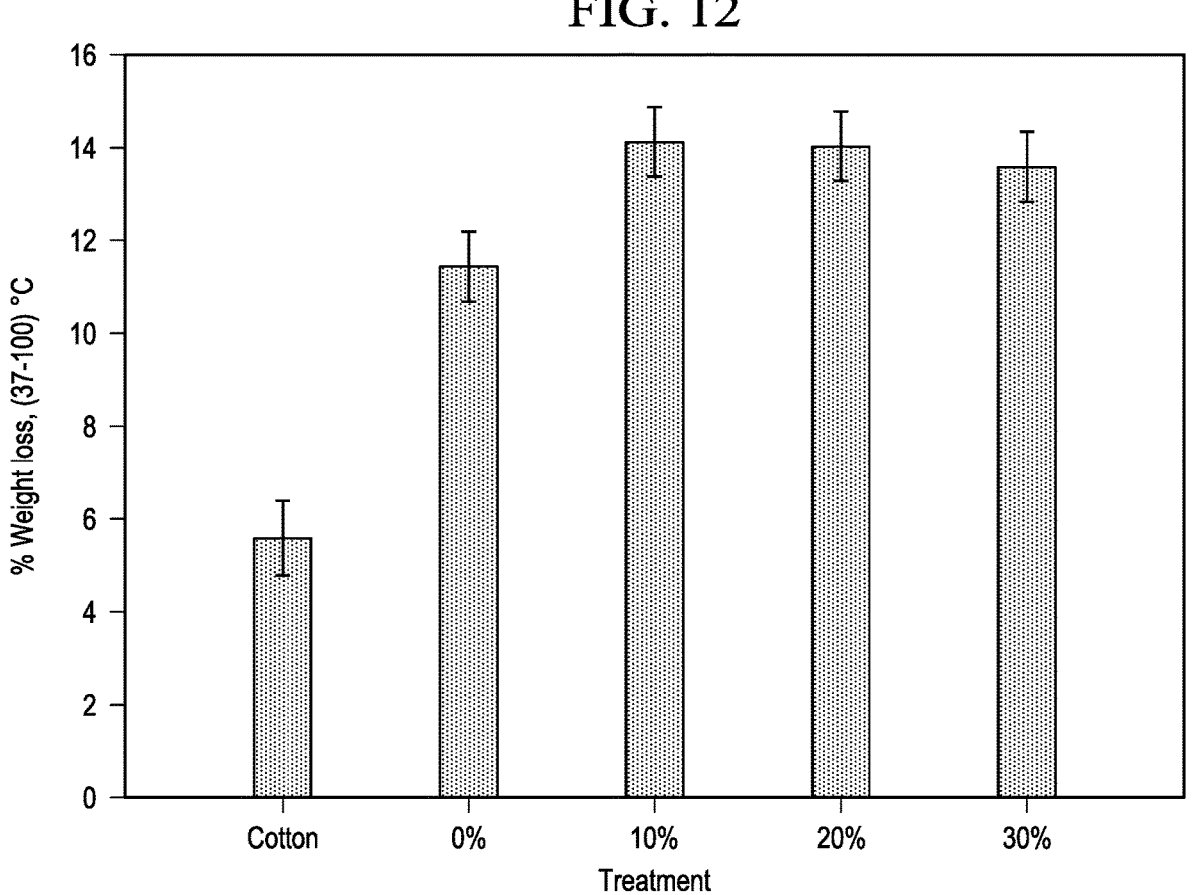
FIG. 12: Weight loss values in the region of 37-100° C. for cotton fiber and regenerated cellulose films (p<0.05). Cotton represents scoured and bleached cotton fiber, while % indicates the % of glycerol.

FIG. 10: (a) XRD patterns of (i) cotton cellulose and regenerated cellulose films treated with different % of glycerol: (ii) 0%, (iii) 10%, (iv) 20%, and (v) 30%. FIG. 11 shows the thermograms of cotton fibers and regenerated cellulose films. The weight loss, observed in the region between 37 and 150° C., is attributed to the evaporation of the absorbed water. The weight loss (%) of absorbed water in the regenerated cellulose films is significantly different from cotton (FIG. 12). The crystallinity of cellulose is greatly reduced in the regenerated cellulose films. Therefore, the regenerated cellulose films with more amorphous regions expose free hydroxyl groups and absorb more water molecules through hydrogen bonding.

X-ray diffraction (XRD) analysis was performed to investigate the crystalline structure of cotton cellulose and regenerated cellulose. FIG. 10 shows the X-ray diffraction patterns of cotton cellulose (pattern curve i) and regenerated cellulose films (pattern curves ii, iii, iv, v). The XRD pattern of cotton fiber shows typical diffraction peaks of cellulose I at 14.7°, 16.5°, 22.7°, and 34.5° 2θ corresponding to the crystal planes (hkl) of 1$\overline{1}$0, 110, 200 and 004. In the XRD pattern of regenerated cellulose films, the sharp crystalline peaks at around 14.7°, 16.5°, 22.7° 2θ are absent, and; instead, the broad and weak crystalline peaks are present in the 200 (hkl) plane. It demonstrates that the crystallinity of cellulose is highly reduced in the regenerated cellulose films. The regenerated film is amorphous in nature.

The second regions of the thermograms are attributed to the cellulose decomposition for cotton fiber and regenerated cellulose film. For the glycerol-treated regenerated films, the weight loss of the samples combines the weight loss due to the decomposition of both cellulose and glycerol. Glycerol decomposition temperature is confirmed by the thermographs of glycerol (FIG. 11). Therefore, its decomposition together with the decomposition of the cellulose component in each sample leads to a significant weight loss in this region.

Figure 13:
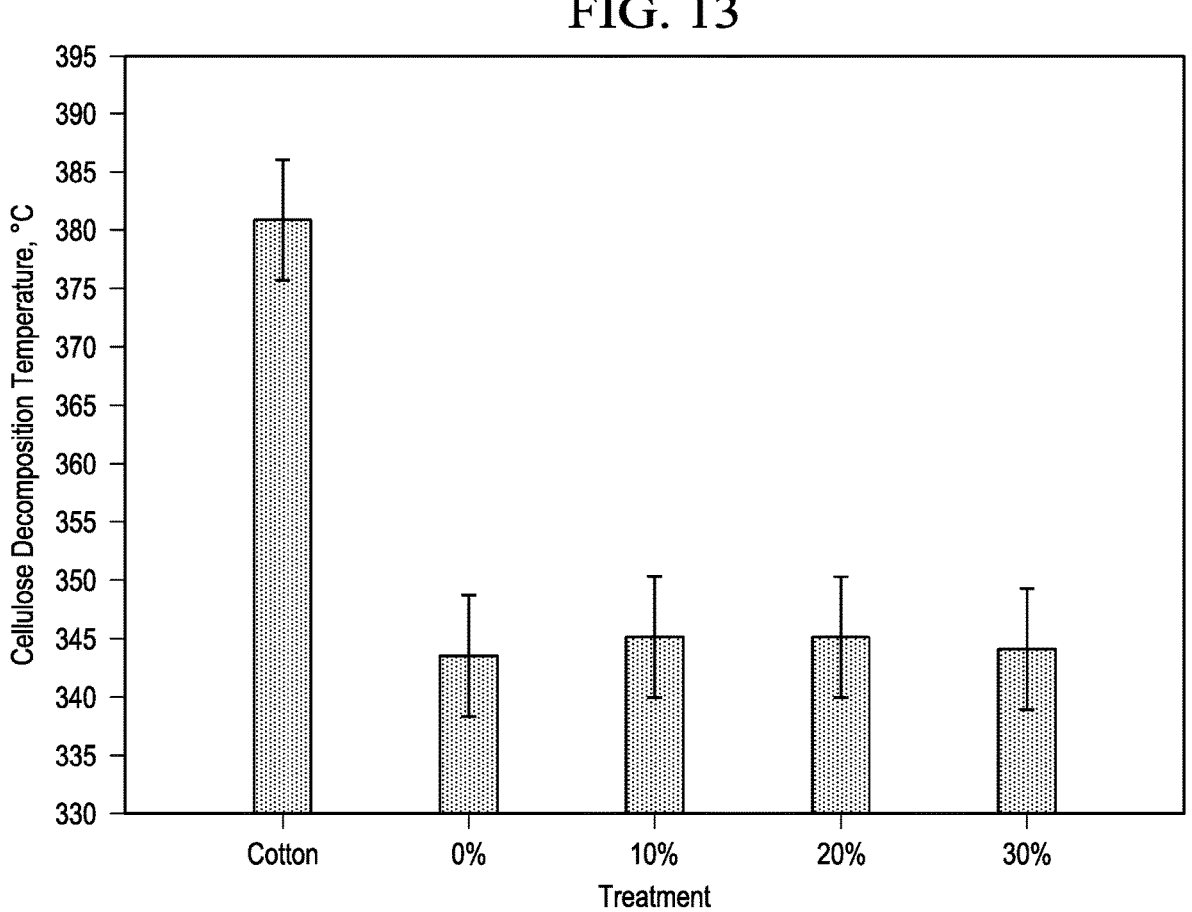
FIG. 13: Cellulose decomposition temperature values in the region of 330-400° C. for cotton fiber and regenerated cellulose films (p<0.05). Cotton represents scoured and bleached cotton fiber, while % indicates the % of glycerol.

The decomposition of the regenerated cellulose films occurred at a lower temperature compared to cotton fiber (FIG. 13). The dissolution and regeneration processes of cellulose reduced the decomposition temperature of cellulose significantly. However, statistical analysis does not show any significant effect of glycerol treatment on cellulose decomposition temperature. The effect of glycerol on reducing thermal stability may be negligible. The cellulose films can be safely used up to 345° C.

FIG. 11: TGA thermograms of cotton fiber and regenerated cellulose film treated with different % of glycerol: (a) TGA curves of (i) cotton fiber and regenerated cellulose films treated with different concentrations of glycerol: (ii) 0%, (iii) 10%, (iv) 20%, and (v) 30%.

FIG. 12: Weight loss values in the region of 37-100° C. for cotton fiber and regenerated cellulose films (p<0.05). Cotton represents scoured and bleached cotton fiber, while % indicates the % of glycerol.

FIG. 13: Cellulose decomposition temperature values in the region of 330-400° C. for cotton fiber and regenerated cellulose films (p<0.05). Cotton represents scoured and bleached cotton fiber, while % indicates the % of glycerol.

Moisture absorption. Moisture absorption properties of cellulose film. Cellulose films with and without glycerol were exposed to two different environments: (1) a saturated NaCl solution and (2) distilled water (ASTM D570).

Cellulose film exposed to saturated NaCl solution. Cellulose films were oven dried at 105° C. until reaching a constant weight. Then, films were placed on a wire mesh over a plastic petri dish containing saturated salt solution. The petri dish containing the films and the wire mesh were placed inside a desiccator. Saturated salt solution was used to maintain a relative humidity of 75% around the sample. Another cellulose film on wire mesh in the plastic petri dish containing saturated salt solution was directly left on the bench top at 65±2% relative humidity. Cellulose films were weighed twice before and after moisture absorption and the moisture absorption was calculated.

Sample exposure to distilled water. Cellulose films were dried at 105° C. until a constant weight was reached. Films were placed in a desiccator to cool and then weighed. Next, the films were placed on the mesh in a petri dish containing distilled water in a controlled environment for 24 h (65±2% relative humidity and 21±1° C.). Each film was weighed at different period of time (0, 1, 2, 3, 4, 5, 6, 8, 12, 15, 18, and 24 h) to calculate the increase in moisture content in the film. At the end of 24 h, the sample was weighted. The moisture absorption was calculated using the following equation:

$$\text{Increase in weight, }\% = \frac{Wm - Wd}{Wd} \times 100\%$$

Where, $W_m$=Weight of the film as a function of time and $W_d$=Dry weight

Figure 14A:
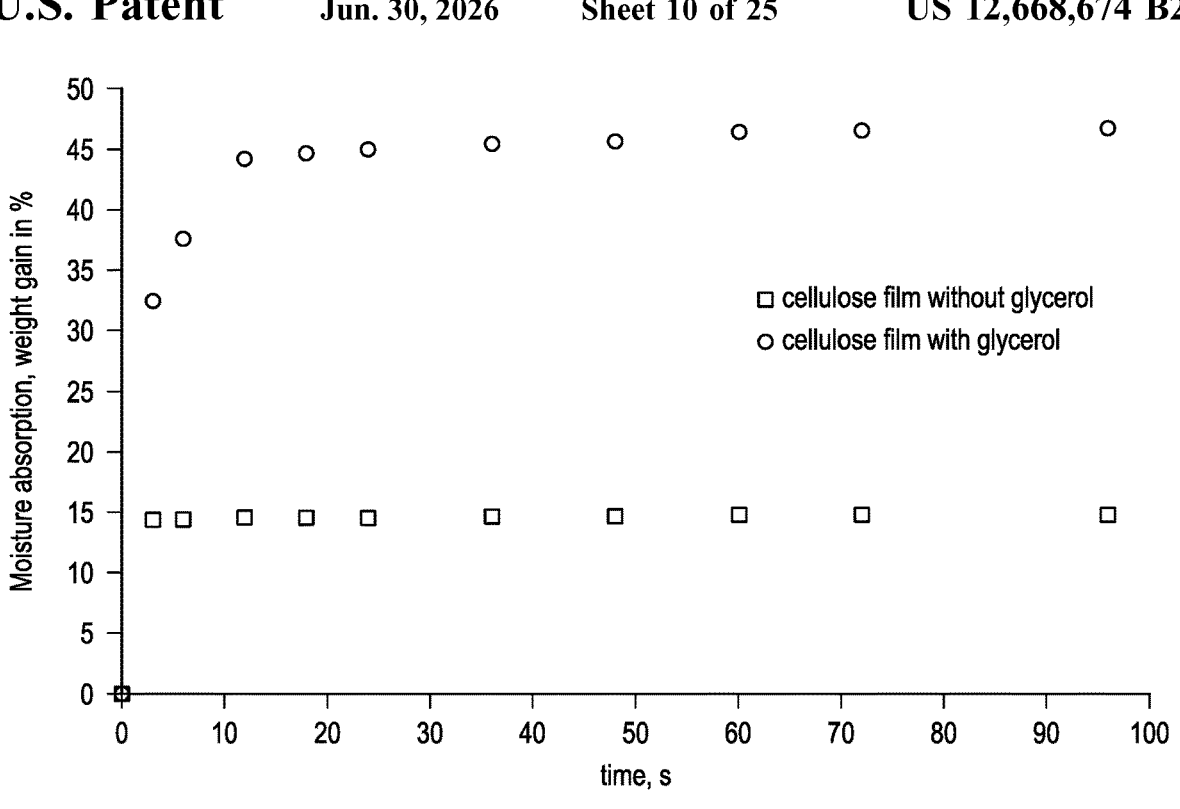
FIGS. 14A and 14B: Moisture absorption of cellulose film exposed to saturated salt solution as a function of time.
Figure 14B:
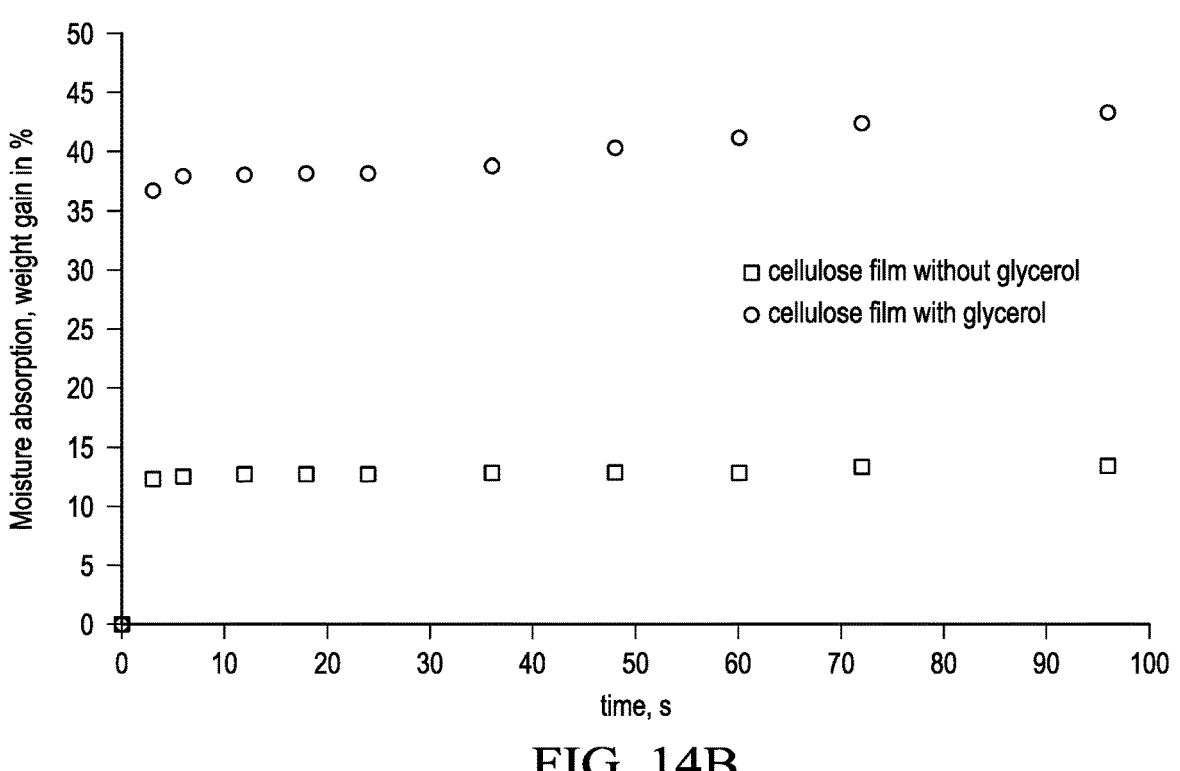
Figure 15:
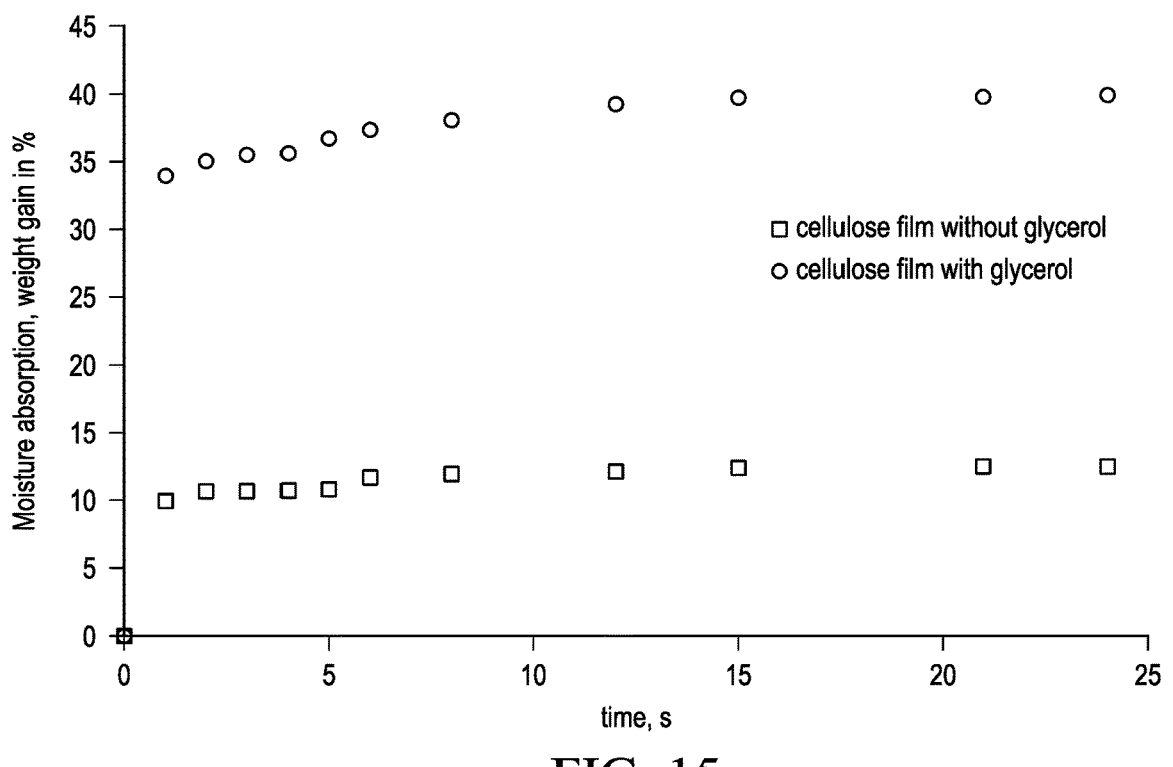
FIG. 15: Moisture absorption of cellulose film exposed to distilled water as a function of time.

Weight change and moisture content analysis. When cellulose films were exposed to 75% relatively humid, the moisture content increases within 3 h (FIG. 14A). The moisture content of the films reached a plateau after 12 h at 75% relative humidity. Cellulose films treated with glycerol show high moisture absorption (~45%) compared to cellulose films without glycerol treatment (~15%) (FIG. 14B). As shown in FIGS. 14A and 14B, there is no difference in moisture absorption between cellulose films exposed to 75% relatively humidity environment (desiccator) and 65±2% moisture-controlled laboratory. When cellulose films were exposed to distilled water in 65±2% relatively humid environment, cellulose films rapidly absorb moisture from the environment within 1 h (FIG. 15). The glycerol treated film absorb more moisture (~40%) compared to film without glycerol treatment (~12%) (FIG. 15). It suggests that films without glycerol treatment are less hydrophilic compared to films treated with glycerol. To impart hydrophobicity to cellulose films, functionalization of the surface is needed.

FIGS. 14A and 14B: Moisture absorption of cellulose film exposed to saturated salt solution as a function of time: (a) films enclosed in a desiccator (75% relative humidity), (b) films placed on the benchtop (65±2% relative humidity). FIG. 15: Moisture absorption of cellulose film exposed to distilled water as a function of time.

Functionalization of cellulose films to impart hydrophobicity. Plasma induced functionalization of oleic acid. Microwave plasma treatment was performed to impart hydrophobicity to cellulose films. Oleic acid, a mono-unsaturated fatty acid was used as hydrophobic agent. The measurement of the dynamic contact angle of water on the surface of cellulose films was used to evaluate the hydrophobicity of the films. Oleic acid and ethanol were purchased from Fisher Scientific. Commercial grade Argon gas was used for microwave plasma treatment.

Cellulose films with and without glycerol were subjected to microwave plasma treatment using Ar gas (Ar flow rate=60 mL/min, pressure=25 Pa, generator frequency=2.45 GHz, time=240 s power=500 W). Plasma-activated films were immediately immersed in ethanol solutions containing oleic acid with different molar concentrations (0, 0.066, 0.2, 0.3, and 0.4 mol/L). Afterwards, the films were air dried and placed again in the plasma chamber for Ar-plasma treatment for 240 s. The samples were rinsed with ethanol several times to remove excess of non-grafted oleic acid and then air-dried. Prior to contact angle measurement, films were conditioned under standard conditions (65±2% RH and 21±1° C.) for 24 h. Dynamic contact angle measurements were performed using DI water and FTA1000 contact angle instrument (First Angstroms, VA). A drop of water of 5 μL was dispensed onto the surface of the film using G30 needle and pictures of the water drops on the film surface were taken every 3 s within 2 min.

Figure 16A:
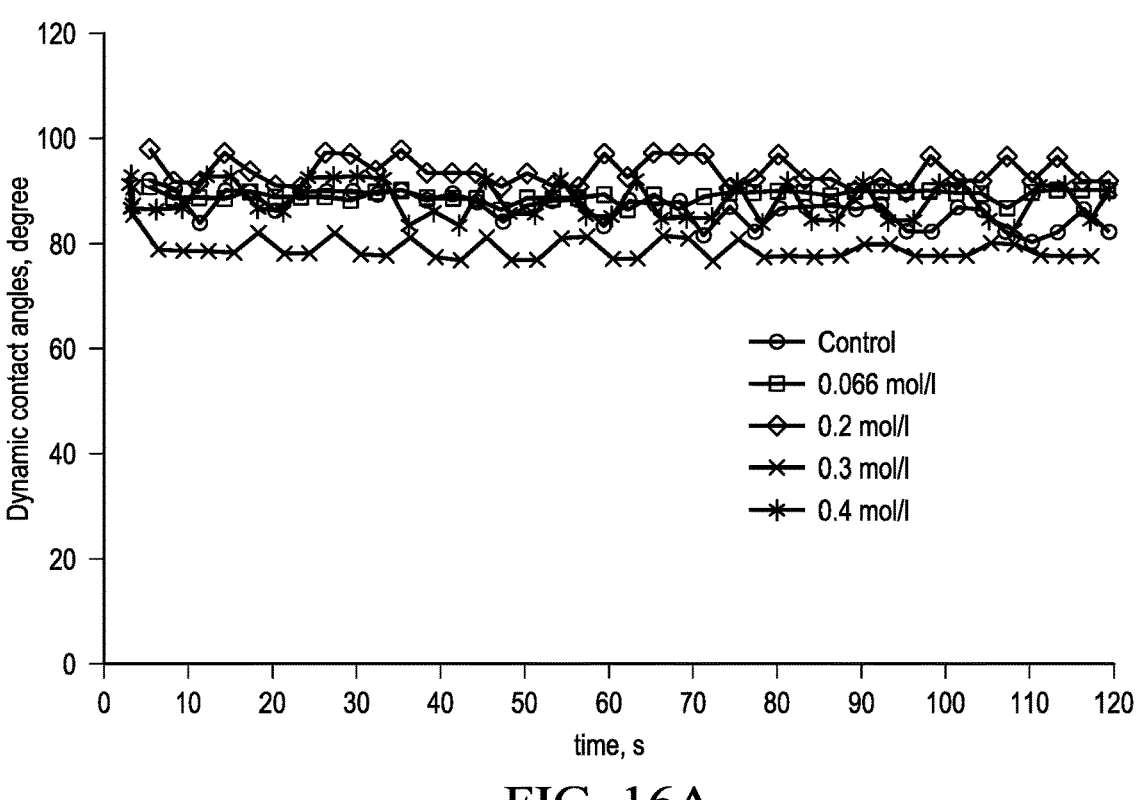
FIGS. 16A and 16B: Dynamic water contact angle of cellulose film functionalized with oleic acid at different concentrations (FIG. 16A) film without glycerol treatment, (FIG. 16B) film with glycerol treatment.
Figure 16B:
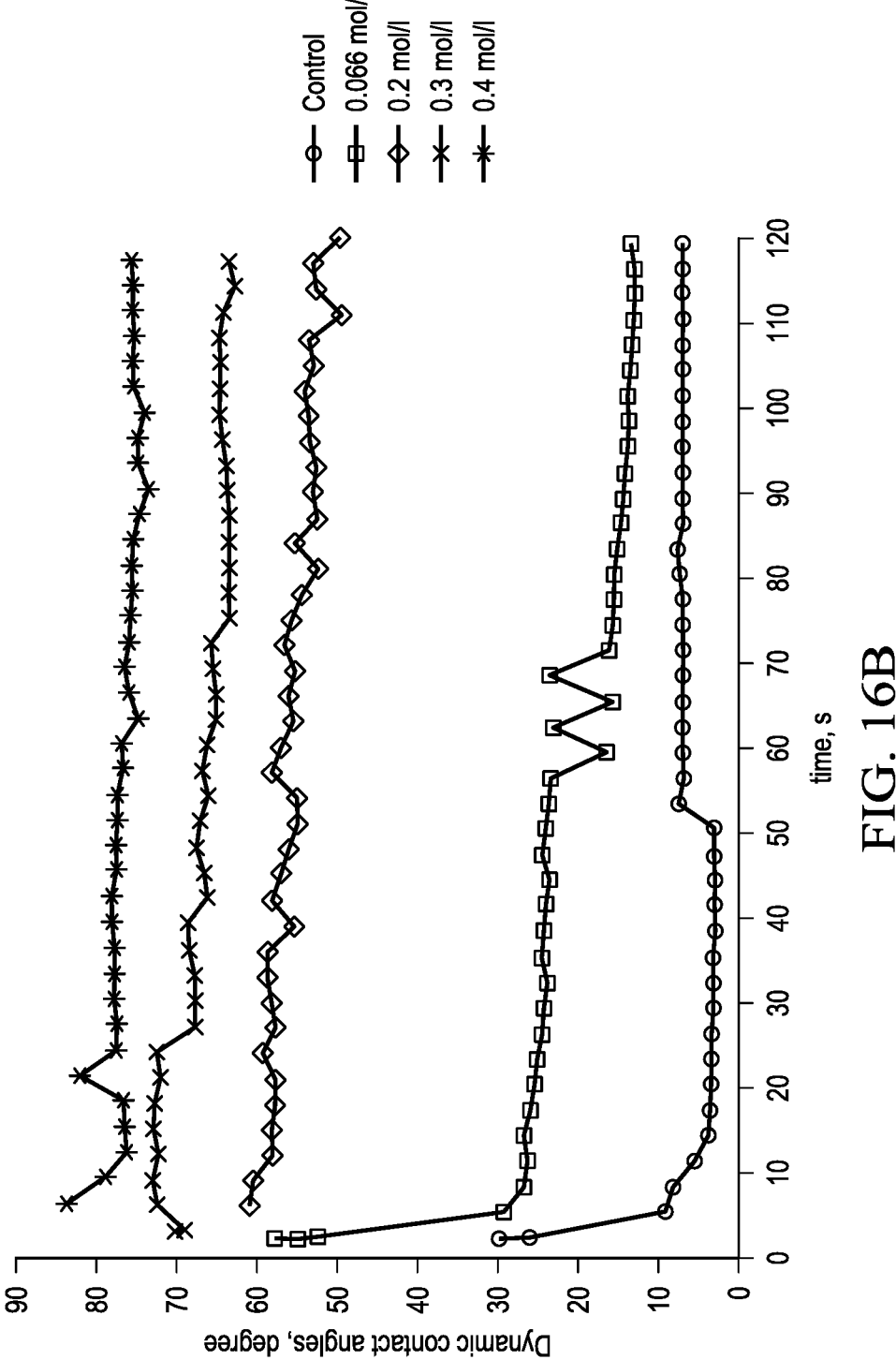

FIGS. 16A and 16B: Dynamic water contact angle of cellulose film functionalized with oleic acid at different concentrations (FIG. 16A) film without glycerol treatment, (FIG. 16B) film with glycerol treatment. FIGS. 16A-16B show dynamic contact angle measurements for different concentration of oleic acid as a function of time. Glycerol treated cellulose films, when functionalized with oleic acid, show a significant improvement in the surface hydrophobicity. As shown in FIG. 16A, functionalization with oleic acid does not remarkably affect the contact angle of water on the cellulose films without glycerol treatment. However, using high concentration of oleic acid, high contact angle values could be achieved on the cellulose films with glycerol treatment (FIG. 16B). To achieve a water contact angle of 80°, the glycerol treated films should be functionalized with oleic acid at a concentration of 0.4 mol/L.

Figure 17A:
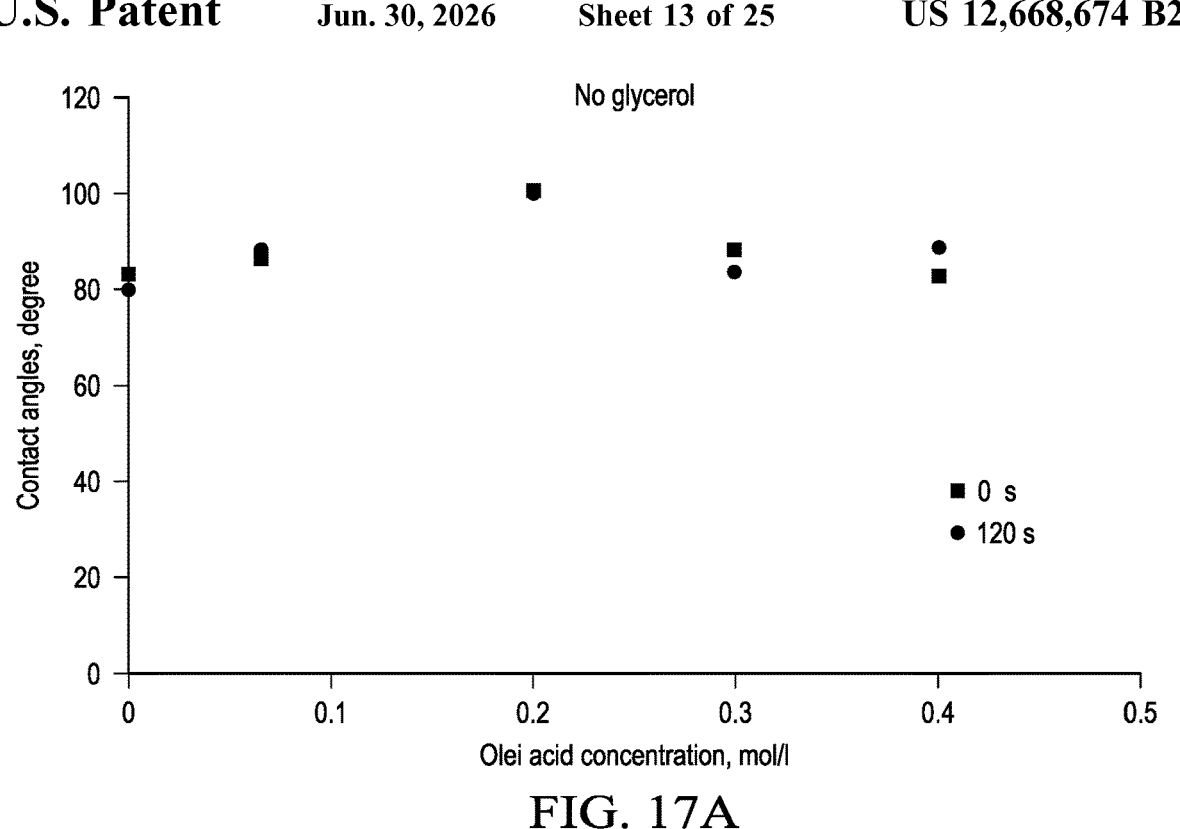
FIGS. 17A and 17B: Dynamic water contact angle of cellulose films as a function of oleic acid concentration at the beginning (0 s) and at the end (120 s) of the experiment.
Figure 17B:
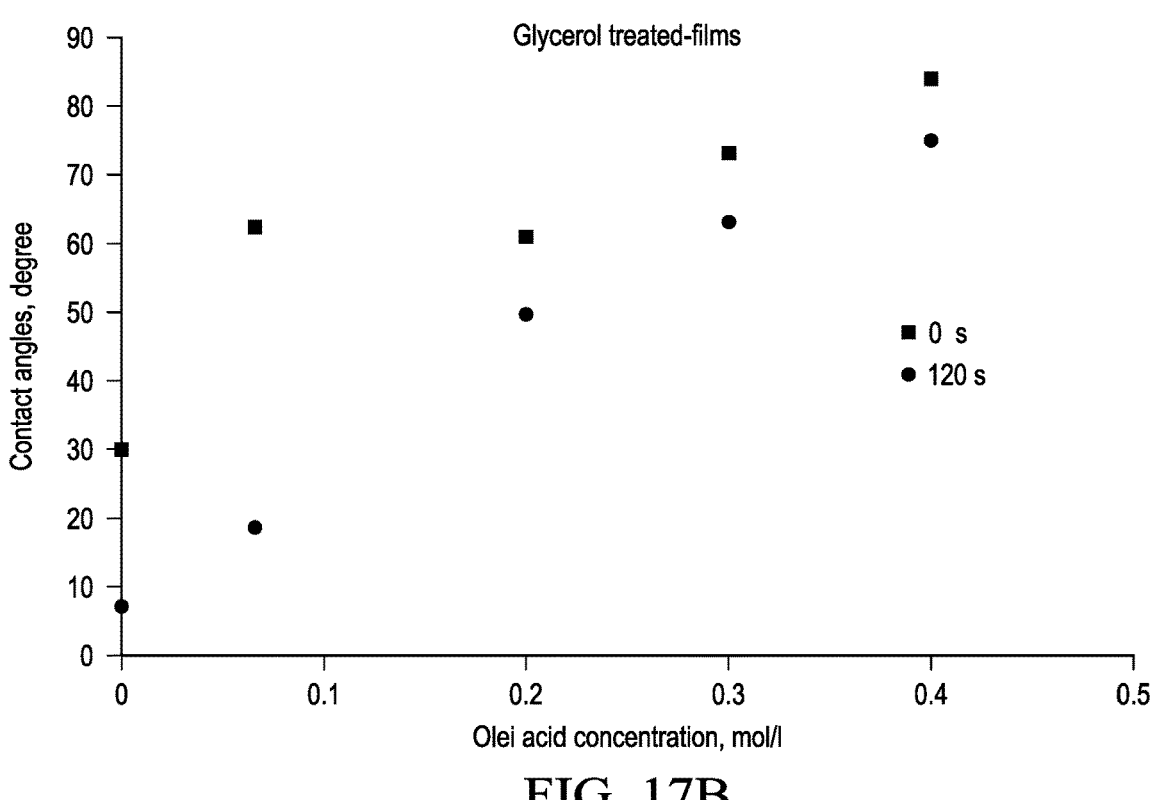

FIGS. 17A and 17B: Dynamic water contact angle of cellulose films as a function of oleic acid concentration at the beginning (0 s) and at the end (120 s) of the experiment: (FIG. 17A) without glycerol treatment, (FIG. 17B) with glycerol treatment. The water contact angles at the beginning and at the end of the experiment are plotted as a function of the oleic acid concentration (FIGS. 17A-17B)). Water droplet does not spread on the surface of the cellulose films without glycerol treatment (FIG. 17A). However, the water droplet spreads faster on the surface of cellulose films with glycerol treatment. The use of oleic acid treatment significantly reduces the spreading rate of water droplet on the surface of cellulose films with glycerol treatment when the concentration of oleic acid is higher than 0.2 mol/l. This indicates that the plasma surface treatment using oleic acid could be an effective method to improve the surface hydrophobicity of the cellulose films with glycerol treatment.

Figures 18, 19:
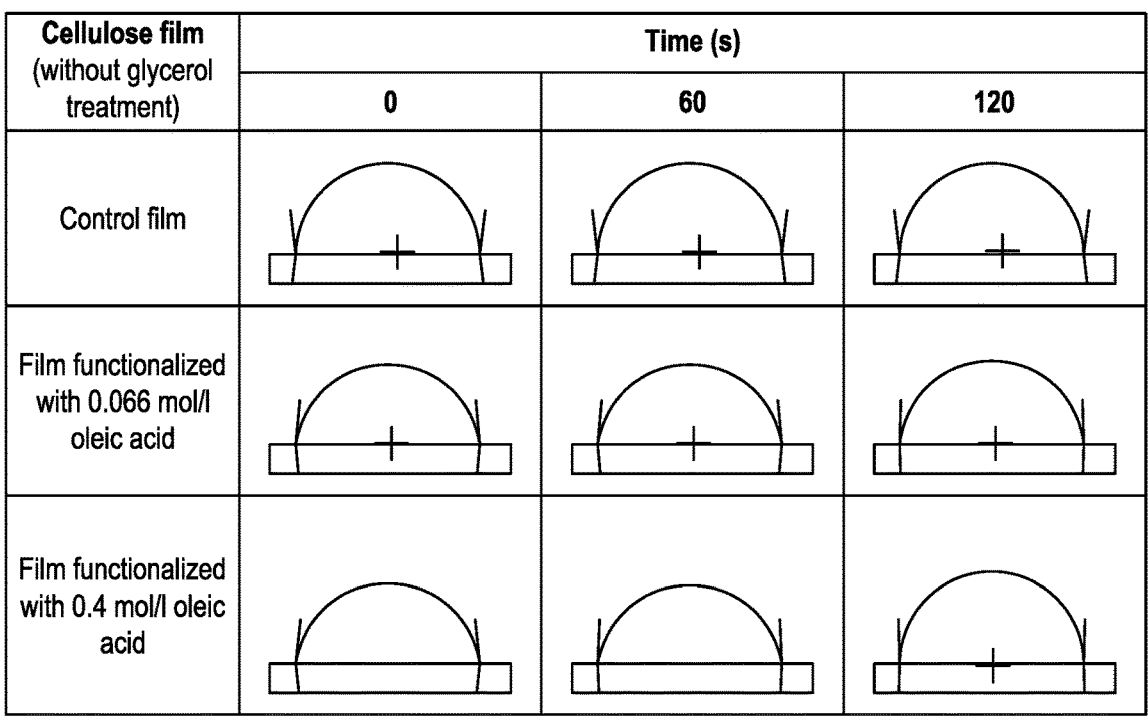
FIG. 18: Water contact angle images of cellulose films without glycerol treatment and functionalized with different concentrations of oleic acid.
FIG. 19: Contact angle images of cellulose films with glycerol treatment and functionalized with different concentrations of oleic acid.

FIG. 18: Water contact angle images of cellulose films without glycerol treatment and functionalized with different concentrations of oleic acid. FIG. 19: Contact angle images of cellulose films with glycerol treatment and functionalized with different concentrations of oleic acid. FIGS. 18 and 19 show pictures of water droplets at 0, 60, and 120 s on the surface of oleic acid functionalized cellulose films without and with glycerol treatment, respectively. The water contact angles on the cellulose film without glycerol treatment but functionalized with oleic acid do not significantly vary with time (FIG. 18). As compared to cellulose films without glycerol treatment, due to the high surface hydrophilicity, the water contact angles of the glycerol-treated cellulose films rapidly change over time as shown in FIG. 19. However, when cellulose films were functionalized using plasma surface treatment with oleic acid, the water contact angle of the films significantly increases (FIG. 19). This study demonstrates that glycerol-plasticized cellulose films could be functionalized with oleic acid to improve the surface hydrophobicity.

Effect of oleic acid concentration on the dynamic contact angle. The inventors compared the moisture absorption properties of cellulose films prepared by dissolving cotton fibers in DMAc/LiCl solvent systems followed by glycerol plasticization. The improvement in hydrophobicity of cellulose films was also determined. This example focused on the optimization of the hydrophobic functionalization of cellulose films. Hydrophobic functionalization was accomplished by means of microwave plasma grafting of oleic acid on the cellulose film surface. The effect of different oleic acid concentrations on the hydrophobicity of the cellulose films was investigated. Furthermore, exploring ways to prepare cellulose films with larger size was initially investigated.

Materials
    Low-grade cotton fibers (micronaire=2.3)
    Scouring and bleaching chemicals
    N-dimethylacetamide/lithium chloride (DMAc/LiCl)
    Glycerol
    4×3" Hydraulic Heat Press (Pressure 44,000 lbs)
    15×15" Swing-Away Manual Heat Press (Pressure=1,350 lbs)

Purification of low-grade cotton fiber. Low-grade cotton fibers were first cleaned using Microdust and Trash Monitor (MTM) and then scoured and bleached to remove wax, pigments, and other non-cellulosic compounds from fibers. For the scouring process, cotton fibers were boiled in an alkaline scouring solution (liquor ratio 1:10) containing a non-ionic wetting agent (1 g/L) and high concentration of NaOH (8 g/L) at 90° C. for 1 h. Then, the solution was poured off and cotton was rinsed with fresh water. The scoured fibers were boiled in a bleaching solution (liquor ratio 1:10) containing wetting agent (0.25 g/L), NaOH (0.35 g/L), sodium silicate (3 g/L), sodium carbonate (0.7 g/L), and sodium hypochlorite (6 g/L) at 90° C. for 90 min. Finally, purified cotton fibers were boiled in fresh water at 90° C. for 20 min, neutralized with 0.25 g/L acetic acid. Finally, the purified cotton was air-dried for the next use.

Dissolution of Cotton fiber in DMAc/LiCl solvent system. Prior to dissolution, purified cotton fibers were oven dried at 105° C. for 24 h and then were suspended in 100 mL of DMAc solvent under stirring at 80° C. for 30 min. Next, 8 g of LiCl powder (oven-dried) was added to the cellulose suspension. The mixture was heated for another 3 h at 80° C. The temperature was decreased to 50° C. and maintained overnight to continuously dissolve cotton fibers. Afterwards, the solution was kept inside the oven at 105° C. for an additional 12 h to accelerate the dissolution of cotton fibers in DMAc/LiCl solvent system until the solution became clear.

Film preparation. The cellulose solution was casted into glass mold and kept on the lab bench for 2 days at ambient temperature until a gel was formed. The resulting hydrogel film was regenerated in DI water for 5 days with DI water exchange periodically (twice or three times a day) to remove the solvent. The regenerated cellulose film was treated with aqueous glycerol (30%) for 2 days. The glycerol-treated cellulose film was subjected to hot pressing at 120° C. for 15 min using the hot-press machine with a platen of 3 in×4 in. To obtain cellulose film with larger size, the solution was casted into homemade glass/aluminum foil molds. It was hot-pressed using hot-press machine with a platen of 15×15 square inches (Across International, New Jersey, USA).

Hydrophobic functionalization of cellulose films. A microwave plasma treatment was performed to impart hydrophobicity to cellulose films. Oleic acid, a mono-unsaturated fatty acid was used as hydrophobic agent. Oleic acid and ethanol were purchased from Fisher Scientific. Commercial grade Argon gas was used for microwave plasma treatment. Cellulose films with and without glycerol plasticization were subjected to microwave plasma treatment using Ar gas (flow rate=60 mL/min, pressure=25 Pa, generator frequency=2.45 GHz, time=240 s, power=500 W). Plasma-activated films were immediately immersed in ethanol solutions containing oleic acid with different molar concentrations (0.6, 0.8, and 1.0 mol/L). Afterwards, the films were air-dried and placed again in the plasma chamber for Ar-plasma treatment for 240 s. The samples were rinsed with ethanol several times to remove excess of non-grafted oleic acid and then air-dried.

Characterization. The measurement of the dynamic contact angle of water on the surface of cellulose films was used to evaluate hydrophobicity of the films. Prior to contact angle measurement, films were conditioned under standard conditions (65±2% RH and 21±1° C.) for 24 h. The dynamic contact angle measurements were performed using DI water and FTA1000 contact angle instrument (First Angstroms, VA). A drop of water of 5 µL was dispensed onto the surface of the film using G30 needle and pictures of the water drops on the film surface were taken every 3 s for 2 min.

Figure 20A:
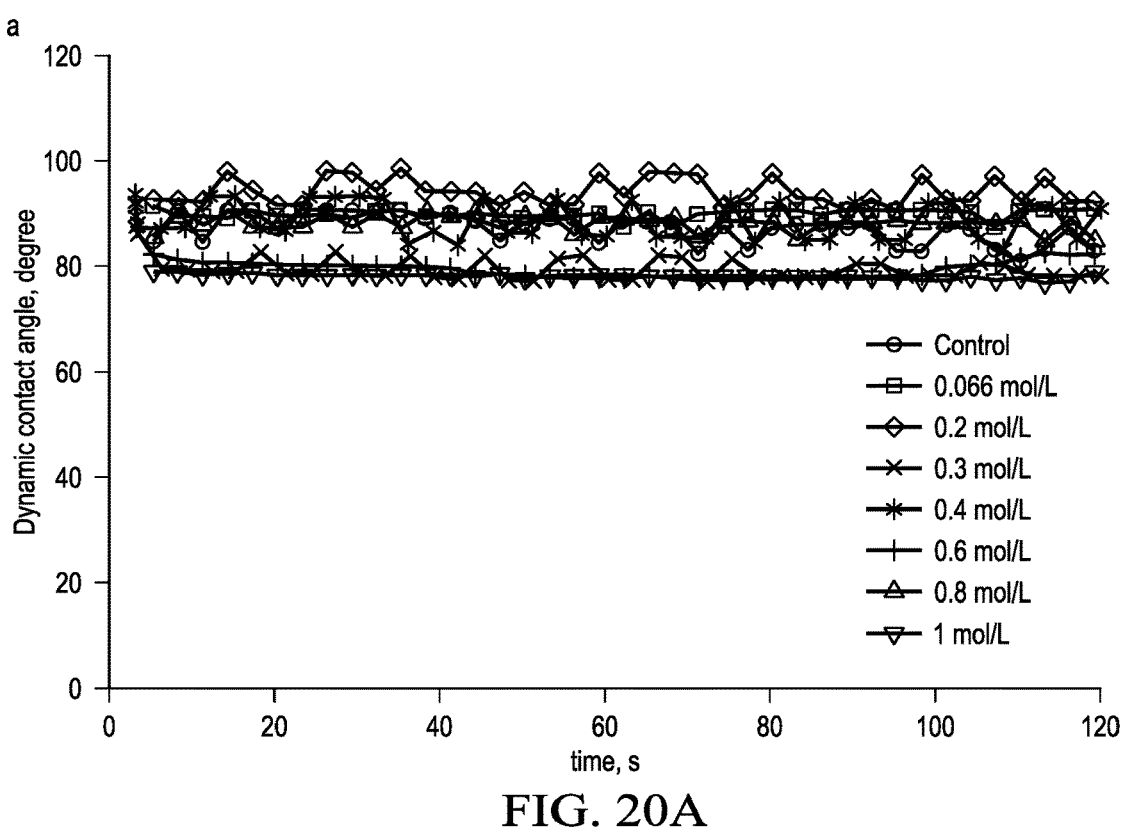
FIGS. 20A and 20B: Dynamic water contact angles of cellulose films functionalized with oleic acid at different concentrations.
Figure 20B:
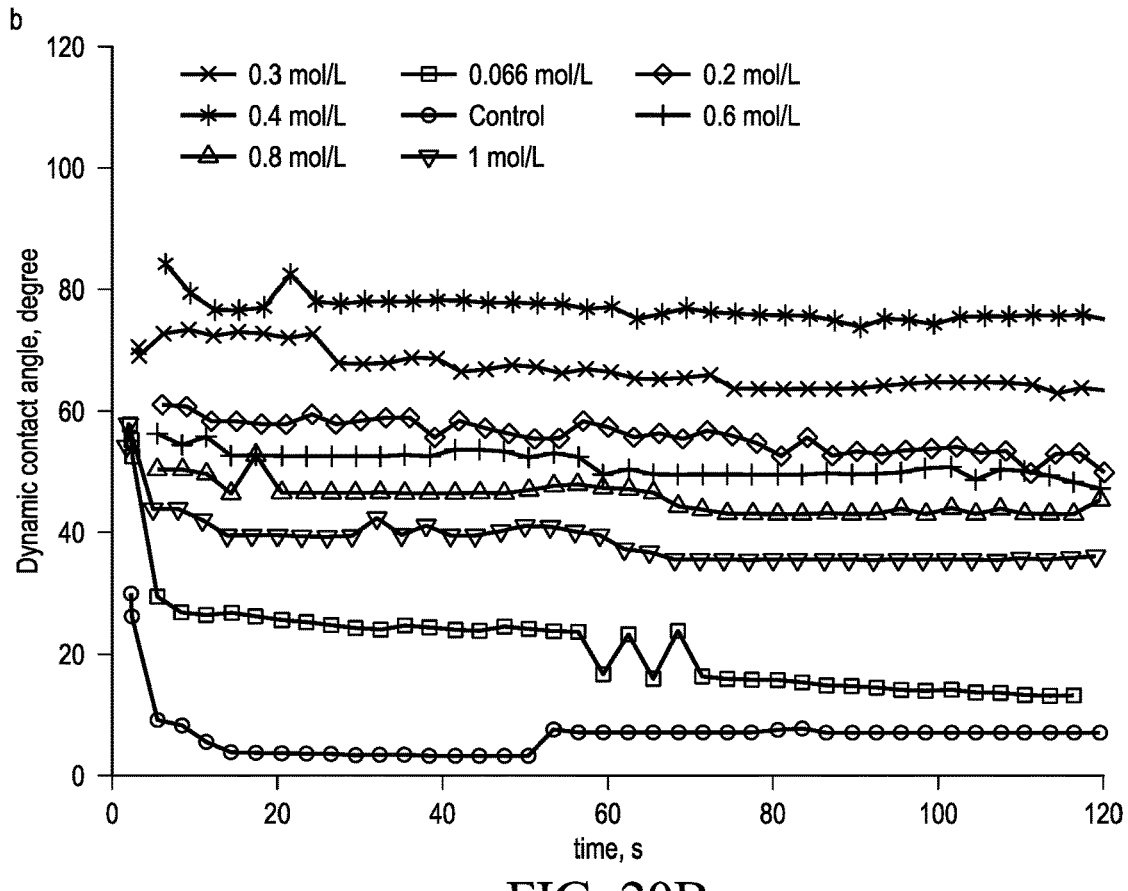
Figure 21A:
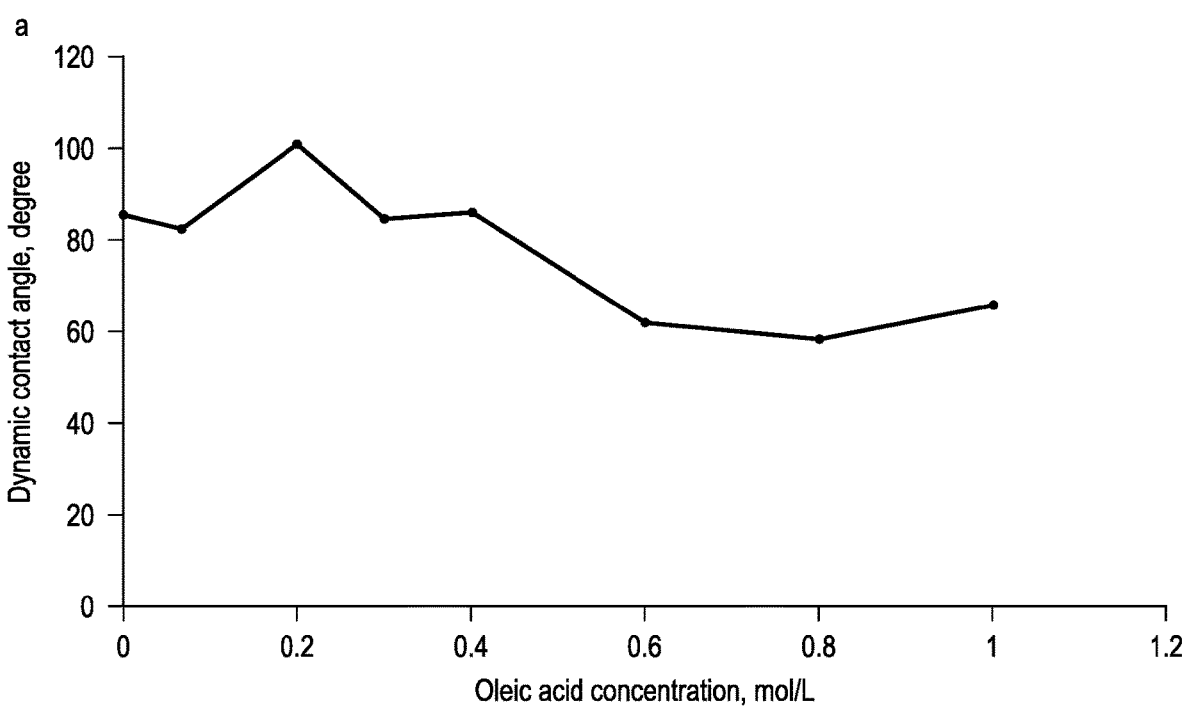
FIGS. 21A and 21B: Dynamic water contact angles of cellulose films functionalized with oleic acid at different concentrations (time, 120 s)
Figure 21B:
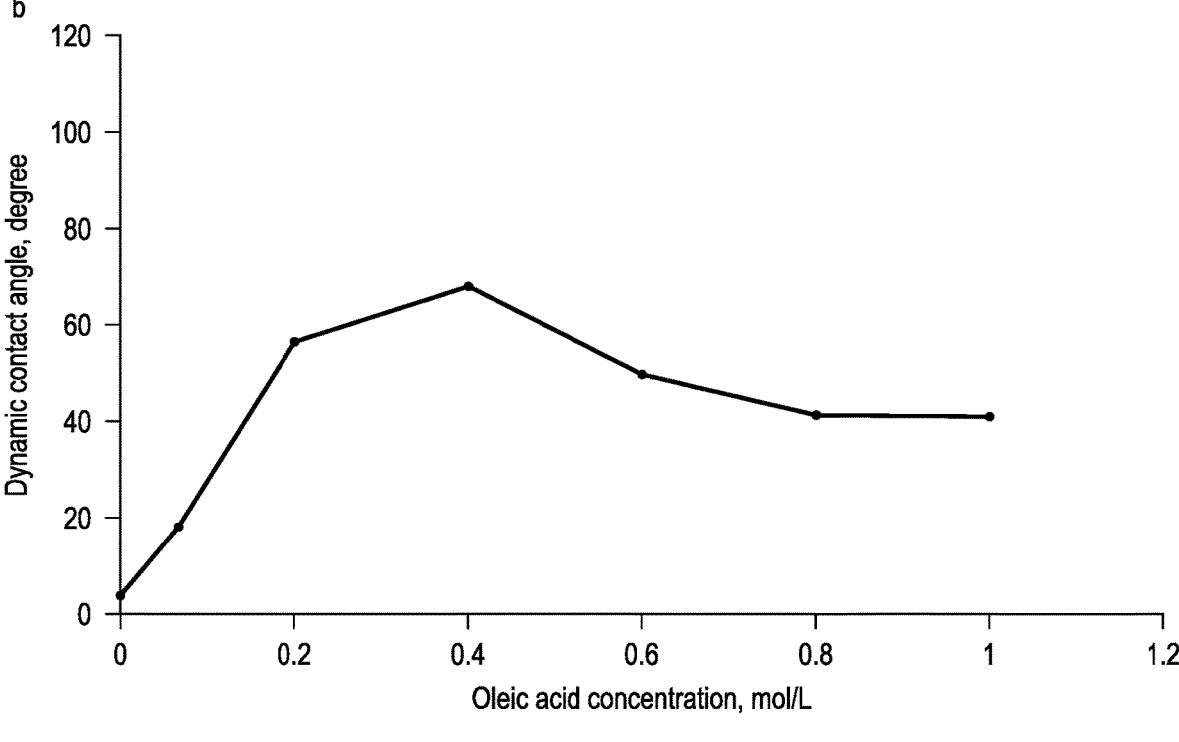

FIGS. 20A and 20B: Dynamic water contact angles of cellulose films functionalized with oleic acid at different concentrations: (a) films without glycerol treatment; (b) films with glycerol treatment. FIGS. 21A and 21B: Dynamic water contact angles of cellulose films functionalized with oleic acid at different concentrations (time, 120 s): (a) films without glycerol treatment, (b) films with glycerol treatment.

Dynamic contact angle analysis: FIGS. 20A and 20B show the dynamic contact angle for different concentrations of oleic acid grafted on the cellulose films as a function of time. As shown in FIG. 20A, increasing the amount of oleic acid on the cellulose films without glycerol treatment does not remarkably affect their contact angles. Increasing oleic acid concentrations on the cellulose films with glycerol treatment leads to a significant impact on the dynamic contact angles. As shown in FIG. 20B, a concentration of oleic acid of 0.4 mol/L enhances the contact angle (hydrophobicity) of the cellulose films with glycerol treatment from ~25° to ~80°. Above this concentration, the increase of oleic acid concentration reduces the contact angle of the films to ~40°. It could be inferred that high amount of oleic acid on the cellulose film with glycerol treatment may generate many vinyl radical (C—C·) under the second plasma treatment, which might be highly active to water molecules and thus increase the surface hydrophilicity. Since glycerol treatment can lead to an excellent flexibility of cellulose films, the optimal concentration of oleic acid to obtain the best hydrophobicity of the cellulose films treated with glycerol is 0.4 mol/L (FIGS. 21A and 21B). Under this concentration, the highly hydrophilic cellulose film (contact angle ~5°) can achieve a reasonable enhancement in film hydrophobicity (~80°).

Figure 22A:
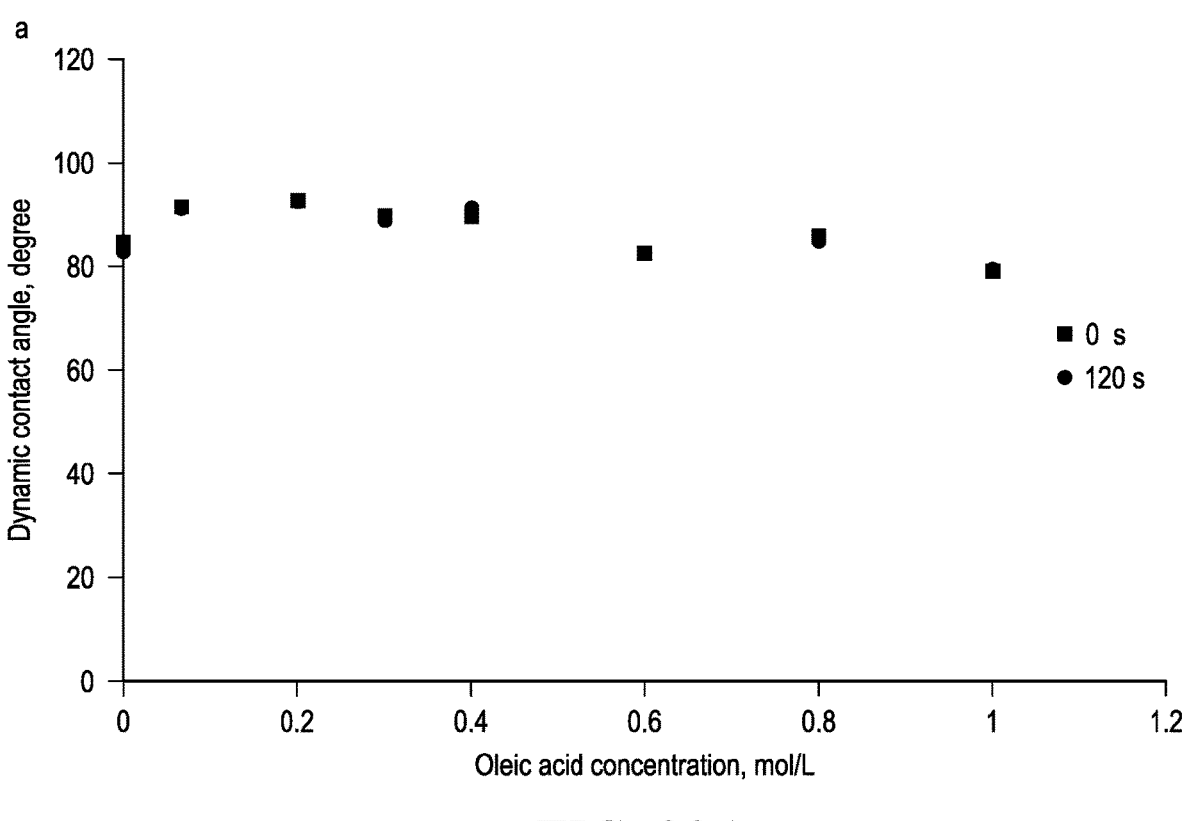
FIGS. 22A and 22B: Dynamic water contact angles of cellulose films as a function of oleic acid concentration at the beginning (0 s) and at the end (120 s) of the experiment.
Figure 22B:
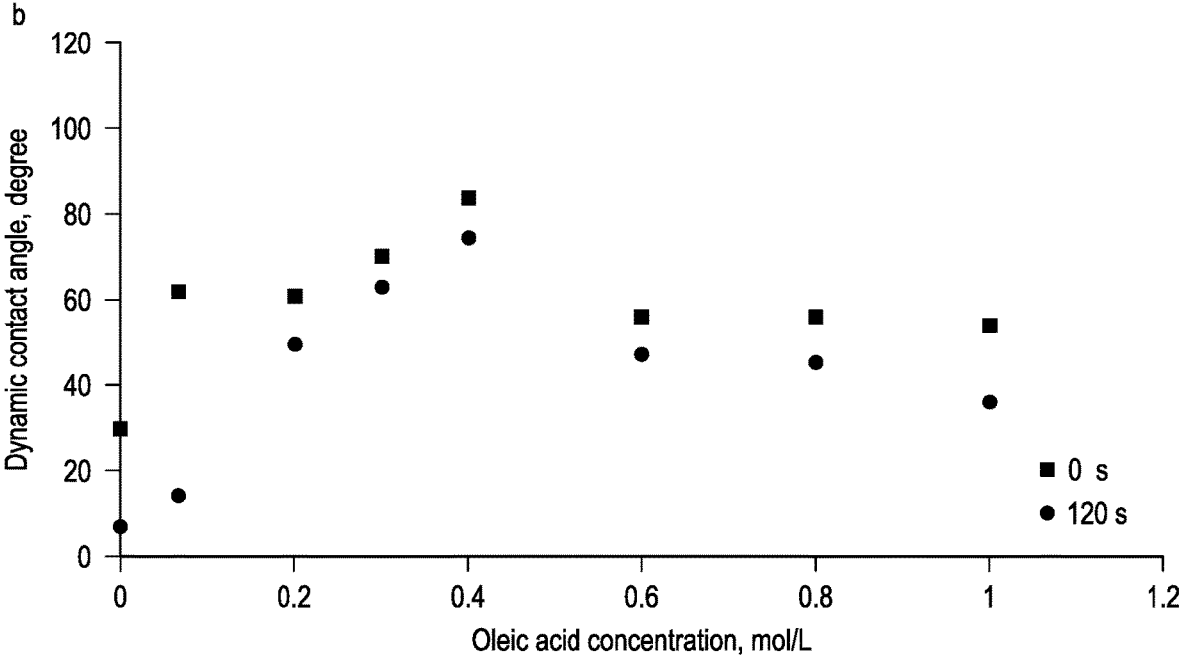

FIGS. 22A and 22B: Dynamic water contact angles of cellulose films as a function of oleic acid concentration at the beginning (0 s) and at the end (120 s) of the experiment: (a) without glycerol treatment, (b) with glycerol treatment. FIG. 23: Contact angle images of water drops on cellulose films with glycerol treatment and functionalized with oleic acid of 0.4 and 1 mol/L. The water contact angles at the beginning and at the end of the measurement are plotted as a function of the oleic acid concentration (FIGS. 22A and 22B). Water droplet does not spread on the surface of the cellulose films without glycerol treatment (FIG. 22A), while the water droplet spreads faster on the surface of cellulose films with glycerol treatment. This demonstrates that the glycerol treatment leads to increased hydrophilicity of the film, although the film treated with glycerol achieved an excellent flexibility. Therefore, oleic acid treatment following glycerol plasticization is required to offset the adverse effect on the waterproof property of the film treated with glycerol. As shown in FIG. 22B, oleic acid treatment significantly reduces the spreading rate of water droplet on the surface of cellulose films, suggesting that the hydrophobicity of the film treated by glycerol has been improved. It is noticed that when the concentration of oleic acid is above 0.4 mol/L, the dynamic water contact angle drops quickly (FIG. 22B). FIG. 23 shows pictures of water droplets on the control and functionalized cellulose films with oleic acid at 0.4 mol/L and 1 mol/L. Increasing the concentration of oleic acid did not help to continuously increase the contact angle (surface hydrophobicity) of the film. This indicates that the plasma surface treatment with oleic acid improves the surface hydrophobicity of the cellulose films, and the optimal concentration of oleic acid is 0.4 mol/L.

Dissolution of hydrolyzed cotton cellulose in NaOH/urea solvent system. A cellulose film was prepared as discussed above, from cotton fiber (mic=2.4) using a NaOH/Urea solvent system. Cellulose fibers were not well dissolved in the solvent system and the resulting cellulose film was not transparent. Therefore, the molecular weight of cotton cellulose was reduced by hydrolyzing cotton fibers with acid. Acidic hydrolysis of native cellulose fibers generates low-molecular-weight cellulose, as stable milky suspensions. Sulfuric acid at a high concentration is the most commonly used treatment method to reduce the molecular weight of cellulose.

Materials

Low-grade cotton fiber (micronaire=2.4)

Scouring and bleaching chemicals

NaOH/Urea

Sulfuric acid (Cat. #LC255503, 96%)

Filter membranes with pore sizes of 220 nm (Cat. SA1J788H5)

Glycerol

Method 1. Hydrolysis of cotton fiber: Cotton fiber was hydrolyzed following the protocol by (Hu and Abidi 2016). Scoured and bleached cotton fiber (micronaire=2.4) was hydrolyzed in 63.5% $H_2SO_4$ at 45° C. for 90 min. The milky solution was centrifuged at 6000 rpm to separate the supernatant and pellet. Centrifugation was repeated several times. However, it was not possible to separate the milky supernatant from the pellet. Therefore, the aqueous suspension of hydrolyzed cotton was kept into an oven at 105° C. to evaporate water from the solution.

Dissolution of hydrolyzed cotton in NaOH/urea: NaOH (7% wt) and urea (12% wt) were directly added to the concentrated aqueous suspension of hydrolyzed cotton. This mixture was kept at 4° C. for 1 h and then was stored at −16° C. for 2 h, followed by thawing at room temperature until it could flow. The resulting cellulose solution was ultrasonicated for 5 min.

Film preparation: The cellulose solution was cast into a petri-dish. The cast solution was put inside the oven at 50° C. until the solution became yellow and gellified. The hydrogel film was regenerated in deionized water and the deionized water was exchanged every 2 h until the film was free of the solvent molecules. The regenerated cellulose film was plasticized with aqueous glycerol (30%, w/v) for 2 days. Finally, the regenerated hydrogel film was subjected to hot pressing (44,000 lbs) at 120° C. for 15 min.

Method 2. Sulfuric acid hydrolysis of purified cotton fiber: Cotton fiber was hydrolyzed following the protocol by Hu and Abidi, 2016, with slight modification. Sulfuric acid (96%) was diluted to 40% for cotton fiber hydrolysis. Purified cotton fiber (11 g) was hydrolyzed in 100 mL of 40% $H_2SO_4$ at 45° C. for 120 min. The milky solution was centrifuged at 7,500 rpm, which clearly separated the supernatant and pellet. The supernatant was discarded, and fresh deionized (DI) water was added. Centrifugation was repeated at the same rpm until the supernatant was not clear. The pellet was subsequently neutralized with KOH (3 mol/L) and dialyzed until its pH reached the pH of DI water (pH=6). Then, the pellet was freeze-dried, which turned into fine powder.

Dissolution of hydrolyzed cotton powder: The freeze-dried cotton powder (4%) was dispersed in 40 mL of precooled DI water (4° C.). NaOH (7 g) and urea (12 g) were separately dissolved in 41 mL of precooled DI water (4° C.). Two solution mixture was kept at 4° C. for 1 h and then were mixed under vigorous stirring for 5 min. The resulting solution mixture was stored at −16° C. for 2 h and then was thawed at room temperature until it could flow. The resulting cellulose solution was ultrasonicated for 5 min.

Film preparation. The cellulose solution was cast into a petri dish. The cast solution was put inside an oven at 50° C. until the solution became yellow and gellified. The hydrogel film was regenerated in deionized water and the deionized water was exchanged every 2 h until the film was free of the solvent molecules. The regenerated hydrogel cellulose film was plasticized with aqueous glycerol (30%, w/v) for 2 days. Finally, the regenerated film was subjected to hot pressing (44,000 lbs) at 120° C. for 15 min.

Figure 24A:
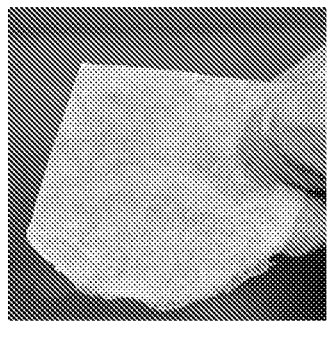
FIGS. 24A to 24C: Cellulose film from (FIG. 24A) cotton fiber, (FIG. 24B) 63.5% acid hydrolyzed cotton, and (FIG. 24C) 40% acid hydrolyzed cotton using NaOH/Urea solvent system.
Figure 24B:
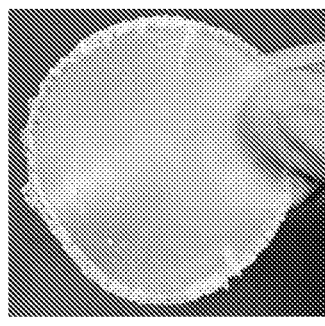
Figure 24C:
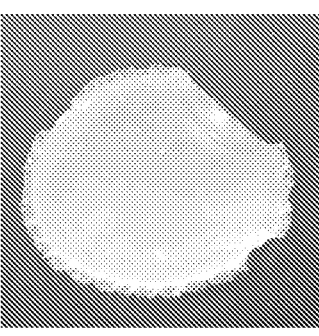

It was not possible to separate the milky supernatant from the pellet when cotton fiber was hydrolyzed with 63.5% $H_2SO_4$. It was hard to determine the concentration of hydrolyzed cellulose in the solution. Therefore, the concentration of $H_2SO_4$ was reduced from 63.5% to 40% to hydrolyze cotton in less harsh conditions. Using these conditions, it was possible to separate the milky supernatant from the pellet. FIGS. 24B and 24C show the appearance of the films prepared from hydrolyzed cotton compared to films prepared from raw cotton (not hydrolyzed) (FIG. 24A). Films prepared from hydrolyzed cotton using NaOH/urea solvent system are strong, semi-transparent, and less flexible. Adjusting the concentration of cellulose in the solution may help improve the transparency of the film.

FIGS. 24A to 24C: Cellulose film from (FIG. 24A) cotton fiber, (FIG. 24B) 63.5% acid hydrolyzed cotton, and (FIG. 24C) 40% acid hydrolyzed cotton using NaOH/Urea solvent system.

Preparation of cellulose-graphene and cellulose-Carbone nanotubes composite films.

Cellulose-graphene composite. The demand for the development of renewable energy storage devices, considered as an alternative to fossil fuel based power sources, is increasing. The use of bio-based electrode material in consumer electronic devices, such as supercapacitor, has drawn considerable research interest. Cellulose with unique properties of biocompatibility, biodegradability, renewability, and high mechanical strength is a good candidate for the development of renewable devices. Incorporation of inorganic nanomaterials, such as graphene, can tailor the functionality of cellulose by imparting conductivity to the materials. Graphene is a planar sheet of carbon nanostructure, whereas, in the lattice of graphene, carbon atoms are tightly packed. Graphene has several properties, such as excellent thermal conductivity, electrical conductivity, large specific surface area, and high mechanical strength. Because processing graphene oxide (GO) in solution is easy (Kafy et al. 2017), GO is used as a precursor for the preparation of functional materials. GO in combination with cellulose provides a conductive network, which makes it suitable to use as an electrode. The application of graphene-based cellulose composite has been reported in various energy storage devices (Kafy et al. 2015). This study aims at the integrating conductive GO into cellulose-based substrate to prepare conductive composite for possible application in energy storage devices.

Materials

Low-grade cotton fiber (micronaire=2.4)

Scouring and bleaching chemicals

N-dimethylacetamide/lithium chloride (DMAc/LiCl)

NaOH/Urea

Glycerol

Graphite

Sulfuric acid ($H_2SO_4$)

Phosphorus pentoxide ($P_2O_5$)

Methods. Graphene oxide preparation: Graphene oxide was prepared using the following four subsequent steps as described below:

Pre-oxidation of graphite: The block of graphite was ground into graphite powder. Graphite powder (9 g) was added into a reaction media consisting of $H_2SO_4$ (50 mL), $P_2O_5$ (7.5 g), and DI water (400 mL). The reaction was conducted in an oil bath (80° C.) for 4 h under stirring. At the end of the reaction, the reaction medium was centrifuged and the supernatant was discarded. Fresh DI water was added after discarding the supernatant until the pH reaches the pH of DI water (pH=6). The pellet was vacuumed to remove the liquid. Next, the pellet was vacuum dried inside an oven at 50° C.

Oxidation of graphite: Pre-oxidized graphite powder (~8 g) was dispersed in the reaction medium consisting of 98% $H_2SO_4$ (100 mL) under stirring for 30 min at room temperature. Then, $KMnO_4$ (12 g) was added in the reaction medium and stirred for 2 h. DI water (150 mL) was added and stirred for 10 min. Once the temperature reached 40° C., 500 mL DI water and 100 mL $H_2O_2$ (30% $H_2O_2$ in water, 100 mL) were added. The reaction was performed in an oil bath at 90° C. for 15 min. Then, the solution (950 mL) was left on the benchtop for precipitation and the supernatant was discarded.

Post-oxidation and washing: This process was completed in four steps. First, 150 mL of 0.1 mol/L HCl and DI water was added to raise the reaction solution to the same volume (950 mL) of the oxidized reaction medium. After stirring for 15 min, the reaction solution was left on the benchtop for precipitation until a clear supernatant was obtained and then supernatant was discarded. Next, 100 mL, 50 mL, and 20 mL of 0.1 mol/L HCl was added in second, third and fourth steps, respectively, following the same procedure of the first step.

Dialysis: Graphene oxide suspension was dialyzed against the DI water until its pH reaches the pH of DI water. Next, the sample was ultrasonicated and stored for the next use.

Dissolution of Cotton fiber. DMAc/LiCl solvent system: The protocol reported by Acharya et al. was used to dissolve cotton fibers in DMAC/LiCl solvent system with a slight modification (Acharya et al. 2017). A solution containing 100 ml of DMAc was heated to 100° C. and held for 25 min and then the temperature was decreased to 80° C. Oven-dried (at 105° C. for 24 h) scoured and bleached cotton fibers (1% w:v) were added to DMAc solution and stirred for 30 min at 80° C. Next, 8 g of oven dried LiCl powder was added to the solution and the mixture was heated for another 3 h at 80° C. At the end of heating, the temperature was lowered to 50° C. and the mixture was maintained at this temperature overnight. Since some fibers were not completely dissolved, the solution was kept for additional 12 h at 105° C. in the oven until the solution became clear. Next, 20% freeze dried GO (w:v, weight of freeze-dried GO:volume of cellulose solution in DMAc/LiCl) was added into the solution and the solution was kept inside the oven at 105° C. for 30 min.

NaOH/Urea solvent system: Two solutions were prepared and mixed. Solution 1 consisted of 7% NaOH and 12% urea in precooled DI. Solution 2 consisted of hydrolyzed cotton (4%) dispersed into precooled water. Solutions 1 and 2 were maintained at −4° C. for 1 h, then mixed, and kept at −16° C. for 2 h (stirring was performed every 2 min). Next, the solution was kept at room temperature for thawing. Then 20% GO (v/v) suspension was added into the solution and sonicated for 5 minutes.

Film preparation. The solution was cast into a glass mold and was left for 2 days on the lab benchtop at ambient temperature for gelation. In the case of NaOH/urea system, the cast solution was put inside the oven at 50° C. until the solution became yellow and gellified. The hydrogel films were regenerated in DI water for 5 days. DI water was used to regenerate cellulose and was exchanged every 2 h to remove the solvent. The regenerated cellulose films were treated with aqueous glycerol (0% and 30%) for 2 days, followed by hot pressing at 120° C. for 15 min.

Figure 25:
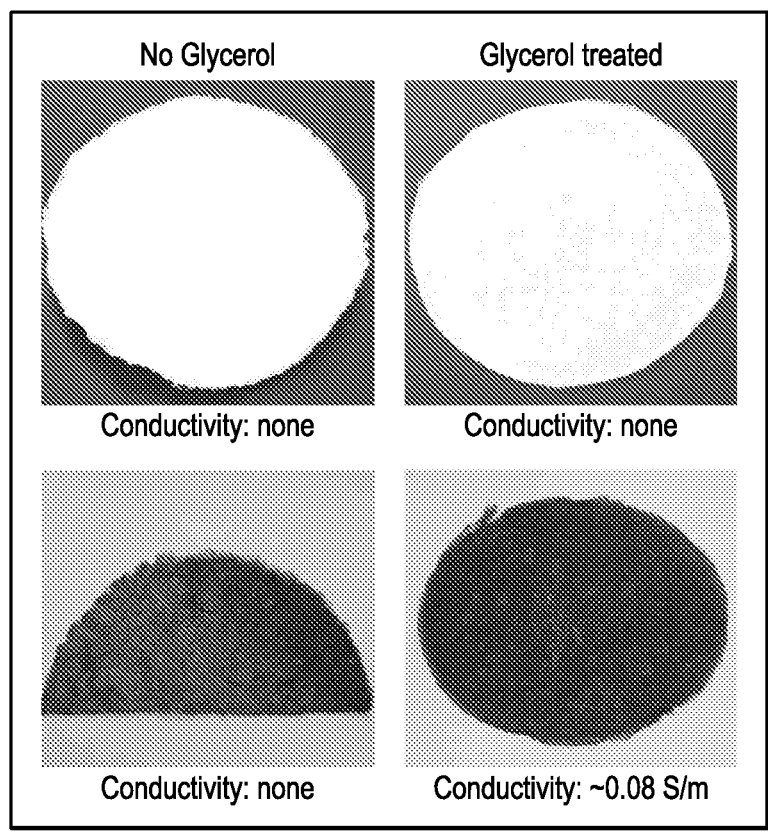
FIG. 25: Composite of graphene/cellulose prepared using NaOH/urea solvent system.
Figure 26:
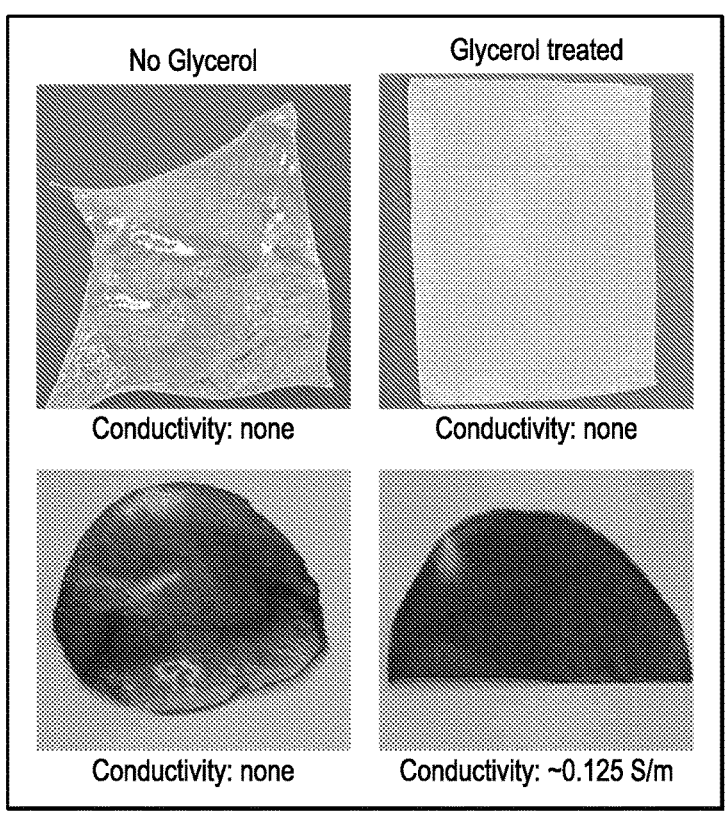
FIG. 26: Composite of graphene/cellulose prepared using DMAc/LiCl solvent system.

FIG. 25: Composite of graphene/cellulose prepared using NaOH/urea solvent system. FIG. 26: Composite of graphene/cellulose prepared using DMAc/LiCl solvent system. FIGS. 25 and 26 show graphene-cellulose composite films obtained using NaOH/urea and DMAc/LiCl solvent systems respectively. Cellulose films with no graphene oxide was not conductive. Graphene oxide-cellulose composites obtained using NaOH/urea with no glycerol was not conductive but when treated with glycerol, the conductivity increased to 0.08 S/m. Graphene oxide-cellulose composites obtained using DMAc/LiCl with no glycerol was not conductive but when treated with glycerol, the conductivity increased to 0.125 S/m. It appears that glycerol may act as a binder to interconnect graphene oxide particles, making the film conductive. Graphene oxide incorporated cellulose composite can be conductive if graphene particles are exfoliated in the composite film. The carbonization process helps exfoliate graphene particles and activates carbon; which could increase significantly the conductivity of the composite.

Cellulose-graphene composite. Carbon nanotubes (CNTs) can also be used to prepare composite films Cellulose-CNTs. Multi-walled carbon nanotubes in powder form was dispersed in gelatin and sonicated. Then the mixture was added to a solution of cellulose in NaOH/urea. The gel was formed and film was obtained by hot-pressing the hydrogel film.

Preparation of paper-like, lightweight, and flexible cellulose films. Flexible electronic devices have experienced rapid growth in recent years. One of the key aspects of flexible energy storage devices is a flexible and conductive substrate, which can be used as an electric current collector (Palchoudhury et al. 2019). Flexible supercapacitors are promising as new energy storage devices. Appropriate flexible power supply devices require the flexibility of devices combined with small volume, lightweight, and good electrochemical performances. Papers or textiles are considered as ideal substrates because of their low cost, flexibility, and highly porous structures, which allow them to absorb active electrode materials (Ko et al. 2017). In this example a paper-like, lightweight, porous, and flexibles substrate was prepared from low-grade cotton fibers. In particular, two pretreatments were performed on scoured and bleached cotton fibers (plasma treatment and freeze-drying) before dissolution and application of different processing conditions to obtain cellulose films with different characteristics (e.g., appearances and textures).

Materials.

Low-grade cotton fibers (micronaire=2.4)

Scouring and bleaching chemicals

NaOH/Urea

Glycerol

Sulfuric acid ($H_2SO_4$)

Purification of low-grade cotton fibers. Low-grade cotton fibers were first cleaned using Microdust and Trash Monitor (MTM) and then scoured and bleached to remove wax, pigments, and other non-cellulosic compounds. During the scouring process, cotton fibers were treated with a hot (90° C.) alkaline scouring solution (liquor ratio 1:10) containing a non-ionic wetting agent (1 g/L) and high concentration of NaOH (8 g/L) for 1 h. Then, the treated fibers were rinsed with fresh water. The scoured fibers were treated with a hot (90° C.) bleaching solution (liquor ratio 1:10) containing a wetting agent (0.25 g/L), NaOH (0.35 g/L), sodium silicate (3 g/L), sodium carbonate (0.7 g/L), and sodium hypochlorite (6 g/L) for 90 min. Finally, the scoured and bleached cotton fibers were boiled in fresh water at 90° C. for 20 min, neutralized with 0.25 g/L acetic acid, and air-dried.

Pretreatment of scoured and bleached cotton fibers. Scoured and bleached cotton fibers were divided into three subsamples. One sample was kept as is, and the other two samples were subjected to pretreatments separately.

Plasma treatment: One sample was subjected to microwave plasma treatment using $O_2$ gas ($O_2$ flow rate=60 mL/min, pressure=25 Pa, generator frequency=2.45 GHz, time=240 s power=500 W). The microwave plasma treatment facilitates the dissolution by breaking cellulose chains on the fiber surface.

Freeze-drying: one sample was soaked in water overnight and instantly frozen using liquid nitrogen. Frozen fibers were kept at −4° C. for 2 h and freeze-dried using laboratory freeze dryer (FreeZone® Plus, Freeze Dry Systems, Labconco).

Dissolution of Cotton fiber. All three subsamples were dissolved in NaOH/Urea system using the same protocol. First, two solutions were prepared (solution 1: 7% NaOH and 12% urea in precooled DI water, and solution 2: cotton (1%) dispersed in precooled DI water). Then, both solutions were maintained at −4° C. for 1 h, and mixed under vigorous stirring for 5 min. Next, the sample mixtures were maintained at −16° C. for 2 h. Finally, the solutions were thawed under the room temperature and sonicated for 5 min.

Film preparation. The solutions were cast into a petri dishes and left for 2 days on the lab benchtop at ambient temperature followed by heating in the oven at 50° C. for gelation. The gelated films were regenerated in DI water for three days. Some of the gelated film from plasma treated fibers were subjected to coagulation in 1% $H_2SO_4$ (v:v) before dipping into DI water. DI water in the regeneration bath was exchanged every 2 h to remove the solvent. Regenerated films were separated into two groups. One set of samples was treated with aqueous glycerol (10%) for 2 days and the rest was left without glycerol treatment. All films were freeze-dried and characterized using scanning electron microscopy (SEM).

Figure 27:
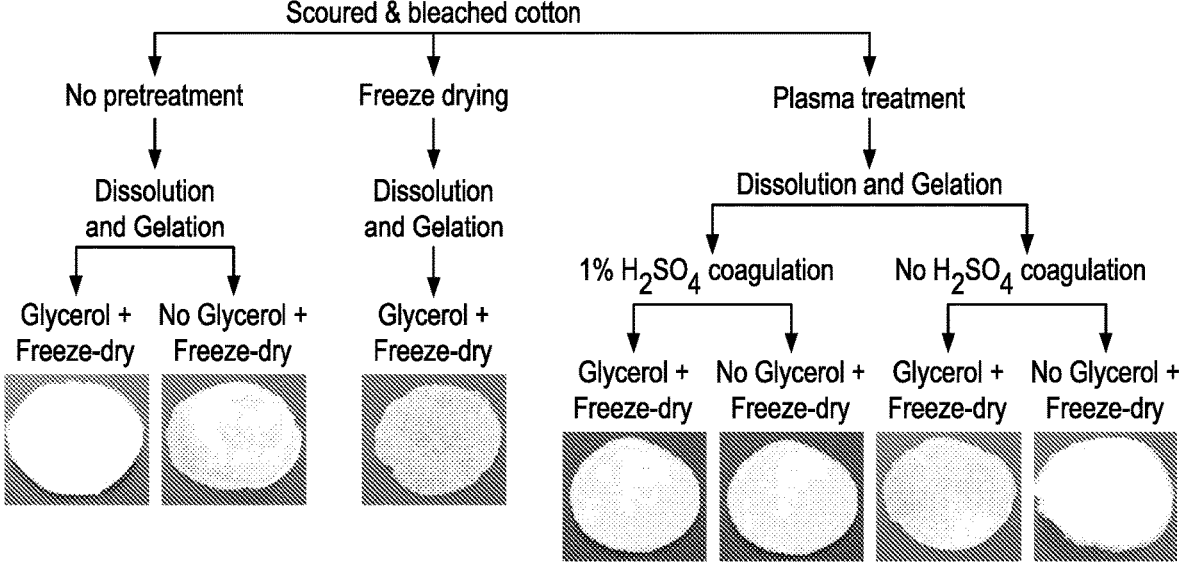
FIG. 27: The appearance of cellulose films prepared from scoured and bleached cotton fibers.
Figure 28:
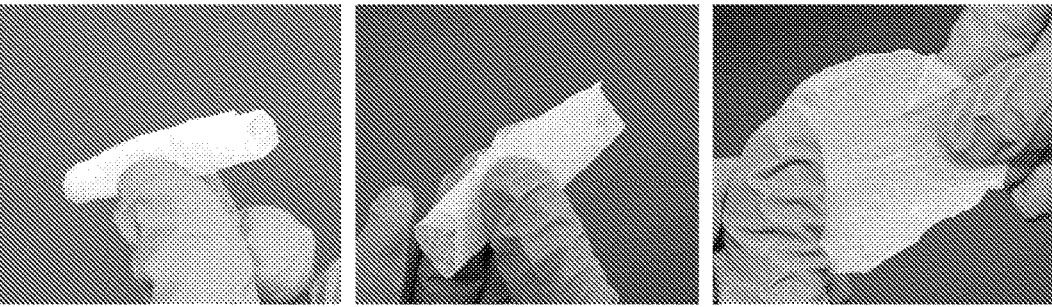
FIG. 28: Cellulose films prepared from freeze-dried cotton fibers.

FIG. 27: The appearance of cellulose films prepared from scoured and bleached cotton fibers. FIG. 28: Cellulose films prepared from freeze-dried cotton fibers. The visual images of cellulose films prepared from scoured and bleached cotton fibers are shown in FIG. 27. Under each treatment, the films prepared without glycerol treatment were opaque and stiff compared to those treated with glycerol. The glycerol treatment improved the flexibility of films. The films prepared from freeze dried fibers were semi-transparent and flexible compared to the other films. In addition, these films can be rolled completely without breakage and are sufficiently strong to withstand applied stress (FIG. 28).

Scanning microscopy micrographs were collected from both sides of cellulose films (FIG. 29) to study their surface morphology. The film prepared from non-pretreated fibers showed the best porous surface morphology when films were not treated with glycerol.

Figure 29:
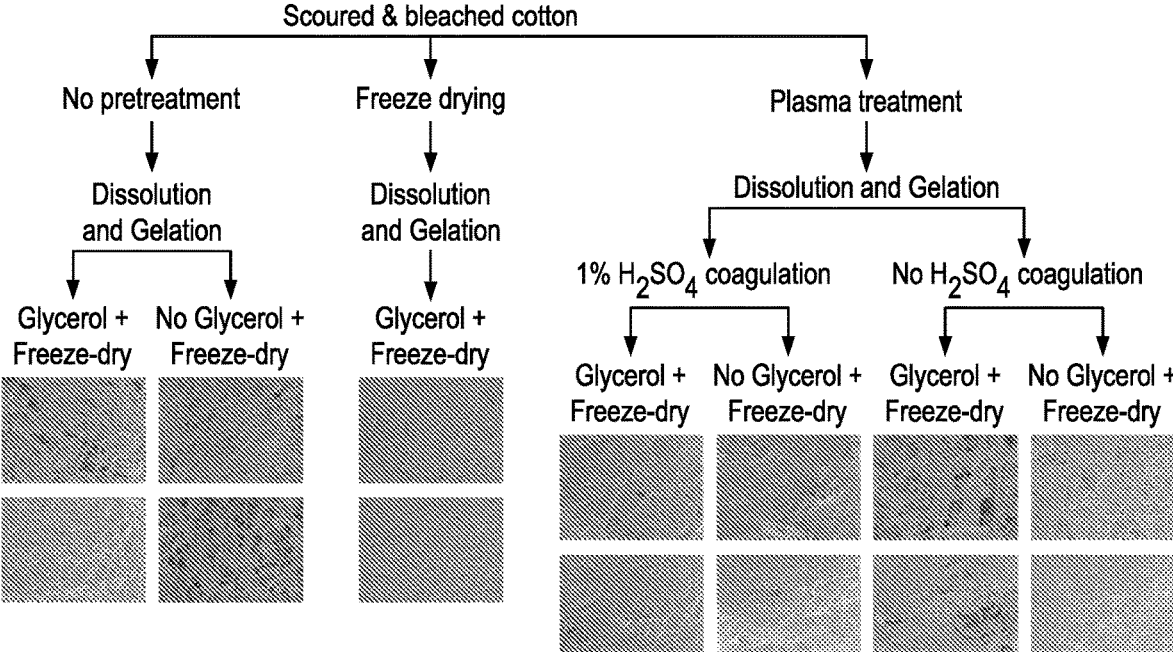
FIG. 29: Scanning electron microscopy micrographs of cellulose films prepared from scoured and bleached cotton fibers.

FIG. 29: Scanning electron microscopy micrographs of cellulose films prepared from scoured and bleached cotton fibers.

The research performed illustrate the possibility of preparing not only cellulose films from low-quality cotton fibers but also other materials with important potential applications.

Cellulose films prepared have similar appearance to petroleum-based films.

Surface functionalization is an important approach to change the characteristics of the surface of the films depending on the applications (hydrophobic vs. hydrophilic).

Paper-like, lightweight, and flexible cellulose films could be prepared.

Composite films exhibiting electrical conductivity could be prepared: Cellulose-graphene and Cellulose-carbon nanotubes composite films.

Other solvents can be used such as ionic liquids alone or in combination with supercritical carbon dioxide ($CO_2$). This can greatly facilitate the dissolution of high molecular weight cellulose extracted from cotton fibers and other biomass such as hemp.

Cross-linker agents can be used to tune the physical properties of the films.

Uses:

Cotton module cover to avoid plastic contaminations of cotton lint by plastics at the gin.

Cotton bale cover.

Soil cover or mulch for growing vegetables and fruits (e.g. water melon, strawberries). It is expected that at the end of the growing season, cellulose-based plastics will degrade in the soil with no impact on the soil as compared to petroleum-based plastics (which need to be removed at the end of the growing season). This can result in savings for farmers.

Disposable packaging bags, concrete fillers.

Replacements of petroleum-based plastic materials in food packaging.

Bio-based electrode materials.

Light weight and flexible energy storage.

In one embodiment, the present invention includes a method of making a bioplastic consists of, consists essentially of, or comprises the steps of: dissolving a low quality cellulose biomass in a solvent, wherein low quality is defined as having little to no textile value; regenerating cellulose fibers by removing the solvent; plasticizing the cellulose fibers in the presence of a polyol into a plasticized film; and hot pressing the plasticized film into the bioplastic. In one aspect, the cellulose is cotton, wood, hemp, bacterial cellulose, microbial cellulose, tunicate, algae, or grass cellulose. In another aspect, the low quality cellulose is a low quality cotton cellulose that has one or more of the following values: (1) micronaire equal to or less than 2.5; length equal to or less than 1.14; uniformity equal to or less than 77%; strength g/tex equal to or less than 29; elongation equal to or less than 7%, color 31-3, or leaf equal to or less than 2. In another aspect, the method further comprises the step of at least one of: scouring or bleaching the low quality cellulose biomass prior to dissolving in the solvent. In another aspect, the solvent is an alkali metal/organic solvent selected from dimethylformamide, dimethylacetamide, tetrahydrofuran, butoxyethanol, 1-propanol, methanol, ethanol, 2-propanol, acetone, dimethylsulfoxide, urea, or sulfolane. In another aspect, the ionic salt is LiCl, NaOH, NaCl, LiF, KCl, or LiBr. In another aspect, the low quality cellulose biomass is dissolved at 0.1-2% weight to volume in the solvent. In another aspect, the step of dissolving is at a temperature of at least 100° C. degrees or higher for at least 1, 2, 3, 4, 5, 6, 7, 8, 9, 10, 11, or 12 hours. In another aspect, the polyol is glycerol, poly(vinyl chloride), poly(vinyl butyral), poly(vinyl acetate), polypropylene glycol, polyethylene glycol, ethylene glycol or sorbitol. In another aspect, the low quality cellulose biomass is dissolved in an organic solvent for a first predetermined period of time, and then an ionic salt is added for a second predetermined period of time. In another aspect, the method further comprises the step of forming the bioplastic into a film, a fiber, spun into a yarn, a matrix, a mat, a mesh, or functionalized. In another aspect, the polyol is at 10-99% volume to volume. In another aspect, the method further comprises the step of functionalizing the bioplastic with a plasma in the presence of a fatty acid, oleic acid, linoleic acid, or aliphatic compounds selected from vinyl laurate, vinyl stearate, vinyl decanoate, and vinyl valerate. In another aspect, the method further comprises the step of hydrolyzing the low quality cellulose biomass prior to the step of dissolving the low quality cellulose biomass. In one aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage.

In another embodiment, the present invention includes a method a bioplastic consists of, consists essentially of, or comprises the steps of: scouring, bleaching, or both bleaching and scouring a low quality cellulose biomass; dissolving the low quality cellulose biomass scoured and/or beached in a solvent and an ionic salt, wherein low quality is defined as having little to no textile value; regenerating cellulose fibers by removing the solvent; plasticizing the cellulose fibers in the presence of a polyol into a plasticized film; and hot pressing the plasticized film into the bioplastic. In one aspect, the cellulose is cotton, wood, hemp, bacterial cellulose, microbial cellulose, tunicate, algae, or grass cellulose. In another aspect, the low quality cellulose is a low quality cotton cellulose that has one or more of the following values: (1) micronaire equal to or less than 2.5; length equal to or less than 1.14; uniformity equal to or less than 77%; strength g/tex equal to or less than 29; elongation equal to or less than 7%, color 31-3, or leaf equal to or less than 2. In another aspect, the solvent is an alkali metal/organic solvent selected from dimethylformamide, dimethylacetamide, tetrahydrofuran, butoxyethanol, 1-propanol, methanol, ethanol, 2-propanol, acetone, dimethylsulfoxide, urea, or sulfolane. In another aspect, the ionic salt is LiCl, NaOH, NaCl, LiF, KCl, or LiBr. In another aspect, the polyol is glycerol, poly(vinyl chloride), poly(vinyl butyral), poly(vinyl acetate), polypropylene glycol, polyethylene glycol, ethylene glycol or sorbitol. In another aspect, the low quality cellulose biomass is dissolved in an organic solvent for a first predetermined period of time, and then an ionic salt is added for a second predetermined period of time. In another aspect, the step of forming the bioplastic into a film, a fiber, spun into a yarn, a matrix, a mat, a mesh, or functionalized. In another aspect, the polyol is at 10-99% volume to volume. In another aspect, the step of functionalizing the bioplastic with a plasma in the presence of a fatty acid, oleic acid, linoleic acid, aliphatic compounds selected from vinyl laurate, vinyl stearate, vinyl decanoate, and vinyl valerate. In another aspect, the step of hydrolyzing the low quality cellulose biomass prior to the step of dissolving the low quality cellulose biomass. In one aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage.

In another embodiment, the present invention includes a system for making a bioplastic, consists of, consists essentially of, or comprises: in a vessel dissolving a low quality cellulose biomass in a solvent, wherein low quality is defined as having little to no textile value; regenerating cellulose fibers by removing the solvent from the dissolved low quality cellulose biomass; adding a plasticizer to the regenerated cellulose fibers in the vessel to form a plasticized film; and forming the bioplastic by placing the plasticized film into a hot press. In one aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage.

In another embodiment, the present invention includes a bioplastic made by the method consists of, consists essentially of, or comprises: dissolving a low quality cellulose biomass in a solvent, wherein low quality is defined as having little to no textile value; regenerating cellulose fibers by removing the solvent; plasticizing the cellulose fibers in the presence of a polyol into a plasticized film; and hot pressing the plasticized film into the bioplastic. In one aspect, the bioplastic can be formulated into an additive for a composite, or a bioplastic composite. In another aspect, the bioplastic can be formulated to replace petroleum-based plastics. In another aspect, the bioplastic can formulated can also be formed into, e.g., plastic containers, covers, cotton bale cover, soil covers, mulch covers, coverings for growing vegetables and fruits, disposable packaging, bags, shopping bags, spun to form filaments, concrete fillers, food packaging, cellulose-conductive composites, bio-based electrodes, light weight and flexible energy storage.

Method of Making Cellulose Bioplastics

Biodegradation studies. Degradation study of cellulose films in moisture-controlled soil. A set of experiments was designed to study the degradation of cellulose films in a moisture-controlled soil, where the degradation process could be initiated by environmental factors, such as temperature, moisture, and microorganisms.

Sample preparation. A large number of plasticized cellulose films were prepared by dissolving cotton fibers in DMAc/LiCl solvent system followed by casting, regeneration, plasticization with 30% of glycerol, and hot pressing. Each film was identified by tagging with a copper tape and weight, length, and width were recorded.

Degradation study of cellulose films. Four plastic trays were used and holes were made at the bottom for proper drainage. Then, soil beds about 10 cm depth were prepared by adding organic potting soil (All-Natural Premium Outdoor Potting Mix, Kellogg Garden Products Corporate, CA, USA). Tap water was sprayed to each soil bed using a watering can and manually mixed. Soil beds were conditioned for 7 days at 12±2% moisture level and water was added as needed to maintain the soil moisture level (~500 ml/48 h). Two soil degradation experiments were conducted: (1) degradation of films buried in the soil: In this experiment, cellulose films were buried 5 cm below the soil surface. Then, the soil bed was gently hand-compacted to ensure a good contact between samples and soil layers; (2) degradation of films placed on the top of the soil to serve as a soil cover. In this experiment, cellulose films were placed on the moist soil beds.

Soil trays were placed inside a high tunnel. The soil moisture content of each tray was recorded daily using a digital soil moisture meter (DSMM500, General Tools & Instruments, USA) and water was added as needed to maintain a level of soil moisture at 12±2% (about 500 ml/48 h). Each tray contained 20 samples and two cellulose films were retrieved from each tray at 7-day intervals. After each retrieval, cellulose films were gently cleaned using a brush to remove attached soil particles and visual images were collected afterwards. Then, cleaned films were conditioned for 24 h and the following data were recorded: (1) Weight; (2) Scanning electron Microscopy images; and (3) stereo microscopy images.

Sample characterization. Visual changes in cellulose films. Photographs of cellulose films were captured immediately after sample retrieval and cleaning.

Stereo microscopy images. Cleaned samples were conditioned under laboratory conditions and visual images of sample surface were recorded using a Nikon Stereo Microscope.

Weight change during sample degradation. Prior to soil burial experiments, each sample was weighed and the weight on day 0 was recorded. After every retrieval, samples were cleaned, conditioned, and the weight was recorded. Then, the percent weight change due to sample deterioration was calculated using the following equation:

$$\text{Weight loss (\%)} = \frac{\text{Initial weight} - \text{Weight after retrieval}}{\text{Initial weight}} \times 100$$

Figure 30:
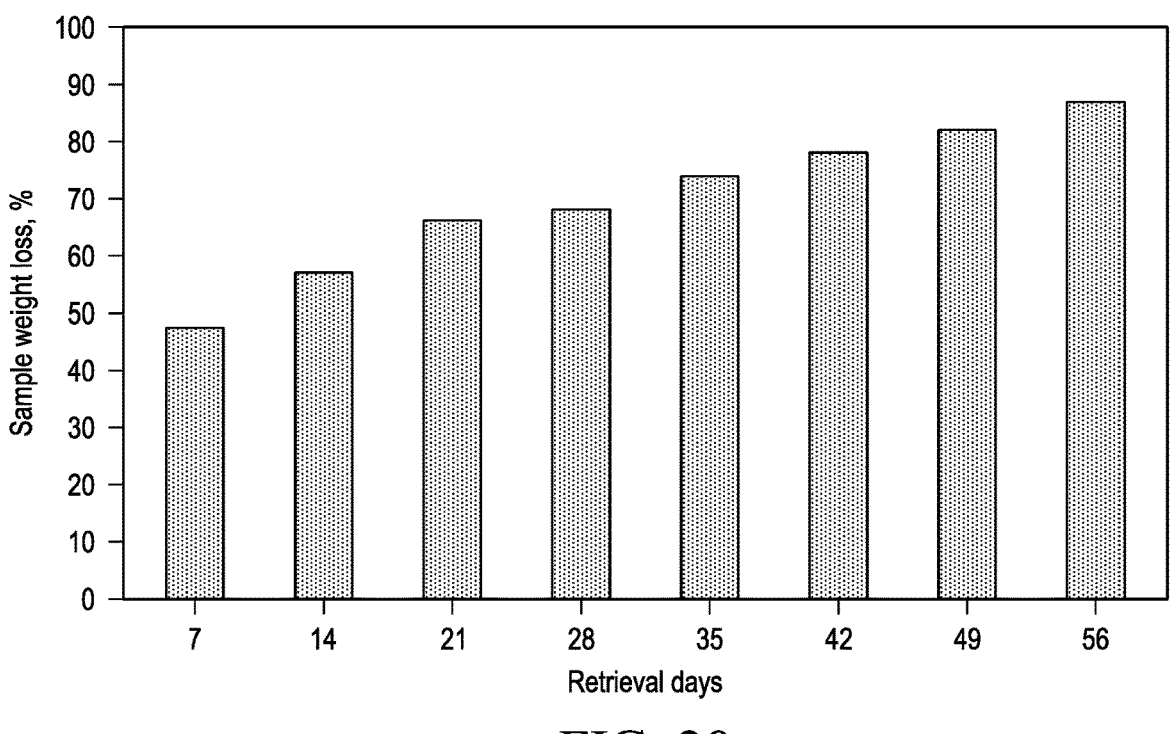
FIG. 30: Weight loss of cellulose bioplastic samples buried in the soil and retrieved at different days.

Soil burial degradation: controlled-moisture conditions. Changes in sample weight. FIG. 30 shows weight loss of cellulose bioplastic samples buried in the soil and retrieved at different days. A gradual weight loss was noticed with the increase of degradation time. In fact, the recorded weight losses of samples retrieved on day 7, 14, 21, 28, 35, 42, 49, and 56 are approximately 47.5, 57, 66, 68, 74, 78, 82, and 87%, respectively (FIG. 30).

Figure 31:
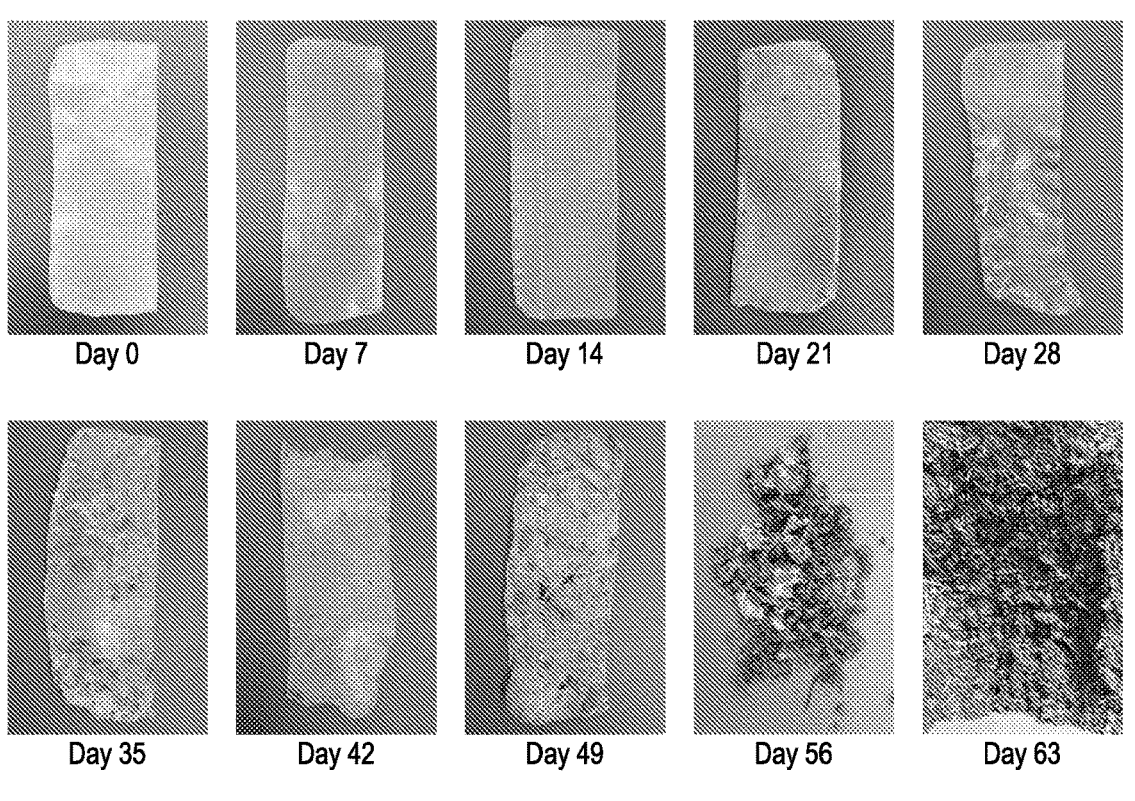
FIG. 31: Visual images of soil burial samples retrieved at different days.

Changes in visual appearances. FIG. 31 shows the gradual changes in sample appearance during the soil burial degradation. The samples retrieved up to 14 days did not show major change in appearance except for minor discoloration. Sample discoloration continued to increase with the retrieval time. Considerable sample shrinkage was also observed. From day 35 onwards, whitish spots were observed on the sample surface, which may be attributed to Fungi mycelia, the vegetative parts of fungi. This was an indication of the onset of sample degradation. These areas grew bigger with time, and holes eventually appeared on the cellulose films. In addition, sample became wrinkled, light, and thin with noticeable holes, especially on day 49. On day 56, samples could not be retrieved as a single piece, and therefore the remaining pieces were carefully retrieved with the surrounding soil layer. Samples were not found on day 63 onwards due to complete decomposition.

Figure 32A:
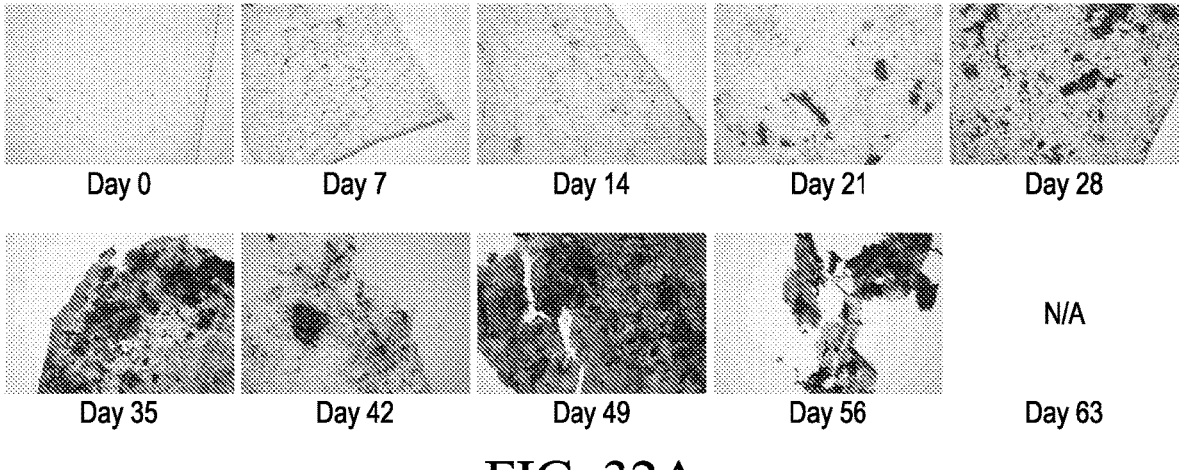
FIGS. 32A and 32B: show Stereo microscopy images of soil burial samples. (32A) samples retrieved at different days and (32B) film surface with fungus mycelium-day 42.
Figure 32B:
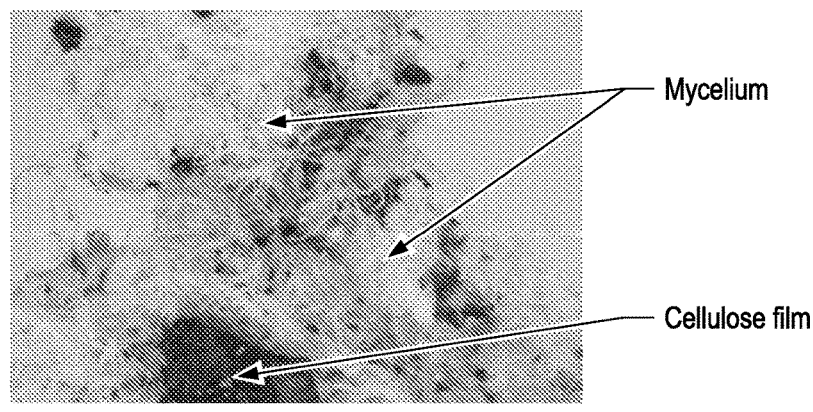

Microscopy changes in sample surface. FIGS. 32A and 32B show stereo microscopy images of cellulose films retrieved during the soil burial experiment. In addition to sample discoloration and soil particles adhering to the surface of the films, the presence of mold on the sample surface and holes/cracks were clearly visible in the stereo microscopic images. As discussed earlier, major surface changes were visible on day 35 onwards. The sample surface of the films retrieved on day 42 appeared very interesting. It clearly showed the presence of mycelia surrounding cellulose films (FIGS. 32A and 32B). The sample retrieved on day 56 looked highly degraded and only a few film fragments were collected from the soil bed. At day 63, films buried were completely degraded.

Figure 33:
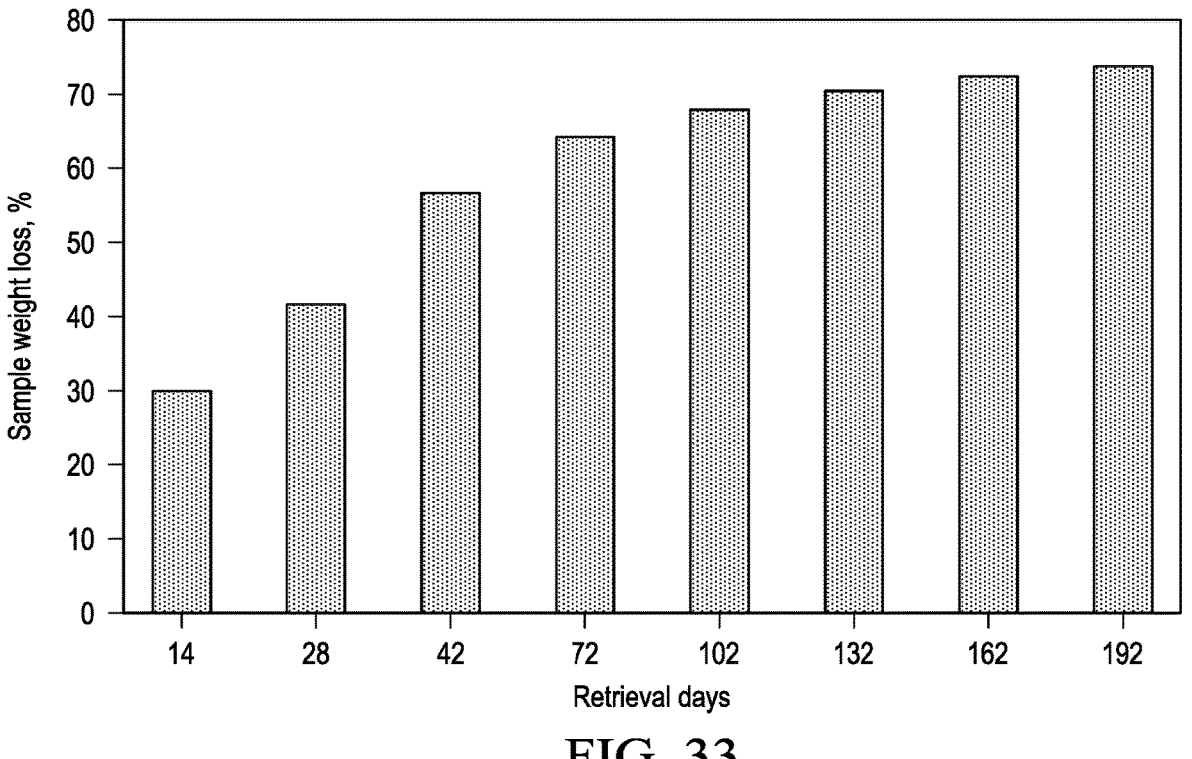
FIG. 33: Weight loss of cellulose bioplastic samples used as soil cover and retrieved at different days.

Soil cover degradation: controlled-moisture conditions. Changes in sample weight. FIG. 33: Weight loss of cellulose bioplastic samples used as soil cover and retrieved at different days. A gradual weight loss was noticed in films placed on the soil surface. The recorded weight losses of samples retrieved on day 14, 28, 42, 72, 102, 132, 162, and 192 are approximately 30.3, 41.8, 56.8, 64.5, 68.1, 70.7, 72.7, and 73.9% respectively (FIG. 33).

Figure 34:
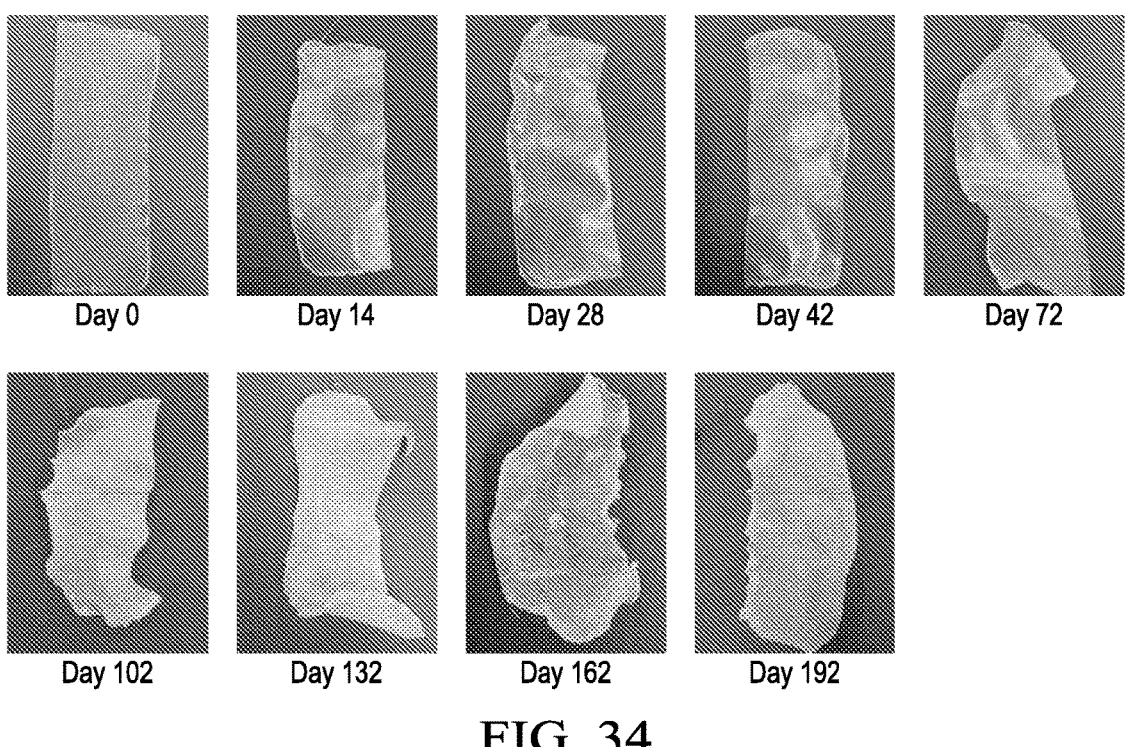
FIG. 34: Visual images of soil cover samples retrieved at different days.

Changes in visual appearances. FIG. 34 shows gradual changes in sample appearance during the soil cover use. Samples retrieved up to 42 days did not show major change in appearance except for minor discoloration and sample shrinkage. Sample discoloration and shrinkage showed a slight increase with the retrieval time. A considerable sample shrinkage and discoloration were observed on day 72 onwards. Samples became stiffer with retrieval time, but cracks or holes were not yet visible on the sample surface until day 192. This means that cellulose bioplastic films could eventually be used as soil cover for at least 6 months with no major degradation.

Figure 35:
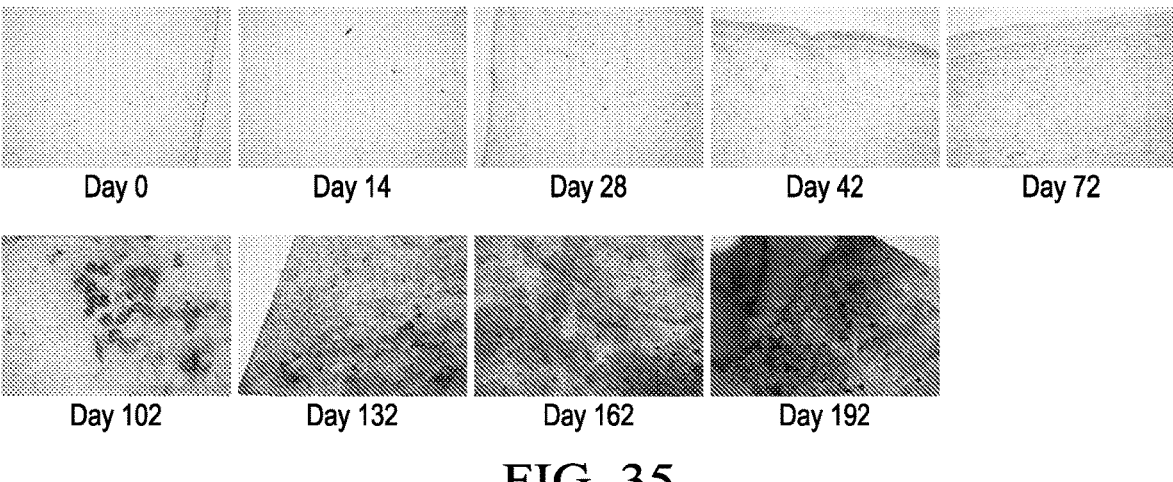
FIG. 35: Stereo microscopy images of soil cover samples retrieved at different days.

Microscopy changes in sample surface. FIG. 35 shows stereo microscopy images of cellulose films retrieved during the soil cover use. Slight discoloration was clearly visible up to 28 days, and color change was intensified afterwards. Similar to the soil burial samples, mycelia were observed on samples retrieved on day 102. However, these mycelia showed some dark spots as well. Cracks or holes have not been so far identified in the soil cover samples retrieved from soil beds. Sample retrieval is still ongoing with the soil cover degradation experiment.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited features, elements, components, groups, integers, and/or steps, but do not exclude the presence of other unstated features, elements, components, groups, integers and/or steps. In embodiments of any of the compositions and methods provided herein, "comprising" may be replaced with "consisting essentially of" or "consisting of". As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only. As used herein, the phrase "consisting essentially of" requires the specified features, elements, components, groups, integers, and/or steps, but do not exclude the presence of other unstated features, elements, components, groups, integers and/or steps as well as those that do not materially affect the basic and novel characteristic(s) and/or function of the claimed invention.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

Acharya S, Hu Y, Moussa H, Abidi N (2017) Preparation and characterization of transparent cellulose films using an improved cellulose dissolution process. J Applied Polymer Science 134 (21)

Baldwin A K, Corsi S R, Mason S A (2016) Plastic Debris in 29 Great Lakes Tributaries: Relations to Watershed Attributes and Hydrology. Environ Sci Technol 50 (19): 10377-10385. doi:10.1021/acs.est.6b02917

Barnes D K, Galgani F, Thompson R C, Barlaz M (2009) Accumulation and fragmentation of plastic debris in global environments. Philos Trans R Soc Lond B Biol Sci 364 (1526):1985-1998. doi:10.1098/rstb.2008.0205

Di Gioia L, Guilbert S (1999) Corn protein-based thermoplastic resins: effect of some polar and amphiphilic plasticizers. J Agric Food Chem 47 (3):1254-1261. doi: 10.1021/jf980976j Free C M, Jensen O P, Mason S A, Eriksen M, Williamson N J, Boldgiv B (2014) High-levels of microplastic pollution in a large, remote, mountain lake. Mar Pollut Bull 85 (1):156-163. doi:10.1016/j.marpolbul.2014.06.001

Geyer R, Jambeck J R, Law K L (2017) Production, use, and fate of all plastics ever made. Sci Adv 3 (7):e1700782. doi:10.1126/sciadv.1700782

Hernandez E, Nowack B, Mitrano D M (2017) Polyester Textiles as a Source of Microplastics from Households: A Mechanistic Study to Understand Microfiber Release During Washing. Environ Sci Technol 51 (12):7036-7046. doi:10.1021/acs.est.7b01750

Hirai H, Takada H, Ogata Y, Yamashita R, Mizukawa K, Saha M, Kwan C, Moore C, Gray H, Laursen D, Zettler E R, Farrington J W, Reddy C M, Peacock E E, Ward M W (2011) Organic micropollutants in marine plastics debris from the open ocean and remote and urban beaches. Mar Pollut Bull 62 (8):1683-1692. doi:10.1016/j.marpolbul.2011.06.004

Hongphruk P, Aht-Ong D (2010) Effects of plasticizers on the mechanical properties of cellulose laurate films. Advanced Materials Research 93-94:117-120

Hu Y, Abidi N (2016) Distinct Chiral Nematic Self-Assembling Behavior Caused by Different Size-Unified Cellulose Nanocrystals via a Multistage Separation. Langmuir 32 (38):9863-9872. doi:10.1021/acs.langmuir.6b02861

Kafy A, Akther A, Zhai L, Kim C, Kim J (2017) Porous cellulose/graphene oxide nanocomposite as flexible and renewable electrode material for supercapacitor. Synthetic Met 223:94-100

Kafy A, Sadasivuni K K, Kim H-C, Akther A, Kim J (2015) Designing flexible energy and memory storage materials using cellulose modified graphene oxide nanocomposites. Phys Chem Chem Phys 17:5923-5931

Ko Y, Kwon M, Bae W K, Lee B, Lee S W, Cho J (2017) Flexible supercapacitor electrodes based on real metal-like cellulose papers. Nat Commun 8 (1):536. doi: 10.1038/s41467-017-00550-3

Ling S D, Sinclair M, Levi C J, Reeves S E, Edgar G J (2017) Ubiquity of microplastics in coastal seafloor sediments. Mar Pollut Bull 121 (1-2): 104-110. doi:10.1016/j.marpolbul.2017.05.038

Miller R Z, Watts A J R, Winslow B O, Galloway T S, Barrows A P W (2017) Mountains to the sea: River study of plastic and non-plastic microfiber pollution in the northeast USA. Mar Pollut Bull 124 (1):245-251. doi: 10.1016/j.marpolbul.2017.07.028

Palchoudhury S, Ramasamy K, Gupta R K, Gupta A (2019) Flexible supercapacitors: A materials perspective. fronto-ers in Materails 5 (83):1-9

Park H M, Misra M, Drzal L T, Mohanty A K (2004) "Green" nanocomposites from cellulose acetate bioplastic and clay: effect of eco-friendly triethyl citrate plasticizer. Biomacromolecules 5 (6):2281-2288. doi:10.1021/bm049690f Peelman N, Ragaert P, Vandemoortele A, Verguldt E, De Meulenaer B, Devlieghere F (2013) Application of biobased materials for packing short and medium shelf life food products. Commun Agric Appl Biol Sci 78 (1):103-107

Peters C A, Bratton S P (2016) Urbanization is a major influence on microplastic ingestion by sunfish in the Brazos River Basin, Central Texas, USA. Environ Pollut 210:380-387. doi:10.1016/j.envpol.2016.01.018

Rillig M C (2012) Microplastic in terrestrial ecosystems and the soil? Environ Sci Technol 46 (12):6453-6454. doi: 10.1021/es302011r Rujnic-Sokele M, Pilipovic A (2017) Challenges and opportunities of biodegradable plastics: A mini review. Waste Manag Res 35 (2):132-140. doi:10.1177/0734242×16683272

Suyatma N E, Tighzert L, Copinet A, Coma V (2005) Effects of hydrophilic plasticizers on mechanical, thermal, and surface properties of chitosan films. J Agric Food Chem 53 (10):3950-3957. doi:10.1021/jf048790+

Thompson R C, Olsen Y, Mitchell R P, Davis A, Rowland S
J, John A W, McGonigle D, Russell A E (2004) Lost at
sea: where is all the plastic? Science 304 (5672):838.
doi:10.1126/science.1094559

Wagner M, Scherer C, Alvarez-Munoz D, Brennholt N,
Bourrain X, Buchinger S, Fries E, Grosbois C, Klasmeier
J, Marti T, Rodriguez-Mozaz S, Urbatzka R, Vethaak A D,
Winther-Nielsen M, Reifferscheid G (2014) Microplastics
in freshwater ecosystems: what we know and what we
need to know. Environ Sci Eur 26 (1):12. doi:10.1186/
s12302-014-0012-7

Wright S L, Rowe D, Thompson R C, Galloway T S (2013)
Microplastic ingestion decreases energy reserves in
marine worms. Curr Biol 23 (23):R1031-1033. doi:
10.1016/j.cub.2013.10.068

Xiao C, Zhang Z, Zhang J, Lu Y, Zhang L (2003) Properties
of regenerated cellulose films plasticized with α-mono-
glycerides. J Applied Polymer Science 89 (13):3500-3503

Yu X, Ladewig S, Bao S, Toline C A, Whitmire S, Chow A
T (2018) Occurrence and distribution of microplastics at
selected coastal sites along the southeastern United States.
Sci Total Environ 613-614:298-305. doi:10.1016/j.scito-
tenv.2017.09.100

What is claimed is:

1. A method of making a bioplastic comprising the steps
of:
    dissolving a low quality cellulose biomass in a solvent,
        wherein low quality is defined as having little to no
        textile value;
    regenerating cellulose fibers by removing the solvent;
    plasticizing the cellulose fibers in the presence of a polyol
        into a plasticized film; and
    hot pressing the plasticized film into the bioplastic,
        wherein the low quality cellulose is a low quality cotton
        cellulose that has one or more of the following values:
        (1) micronaire equal to or less than 2.5; length equal to
        or less than 1.14; uniformity equal to or less than 77%;
        strength g/tex equal to or less than 29; elongation equal
        to or less than 7%, color 31-3, or leaf equal to or less
        than 2.

2. The method of claim 1, wherein the cellulose is derived
from cotton, wood, hemp, bacterial cellulose, microbial
cellulose, tunicate, algae, or grass cellulose.

3. The method of claim 1, further comprising the step of
at least one of: scouring or bleaching the low quality
cellulose biomass prior to dissolving in the solvent.

4. The method of claim 1, wherein the solvent is an alkali
metal/organic solvent selected from dimethylformamide,
dimethylacetamide, tetrahydrofuran, butoxyethanol, 1-pro-
panol, methanol, ethanol, 2-propanol, acetone, dimethyl-
sulfoxide, urea, or sulfolane.

5. The method of claim 1, further comprising adding an
ionic salt to the solvent, wherein the ionic salt is at least one
of: LiCl, NaOH, NaCl, LiF, KCl, or LiBr.

6. The method of claim 1, wherein the low quality
cellulose biomass is dissolved at 0.1-2% weight to volume
in the solvent.

7. The method of claim 1, wherein the step of dissolving
is at a temperature of at least 100° C. degrees or higher for
at least 1, 2, 3, 4, 5, 6, 7, 8, 9, 10, 11, or 12 hours.

8. The method of claim 1, wherein the polyol is glycerol,
poly(vinyl chloride), poly(vinyl butyral), poly(vinyl
acetate), polypropylene glycol, polyethylene glycol, ethyl-
ene glycol or sorbitol.

9. The method of claim 1, wherein the low quality
cellulose biomass is dissolved in an organic solvent for a
first predetermined period of time, and then an ionic salt is
added for a second predetermined period of time.

10. The method of claim 1, further comprising the step of
forming the bioplastic into a film, a fiber, spun into a yarn,
a matrix, a mat, a mesh, or functionalized.

11. The method of claim 1, wherein the polyol is at
10-99% volume to volume.

12. The method of claim 1, further comprising the step of
functionalizing the bioplastic with a plasma in the presence
of a fatty acid, oleic acid, linoleic acid, or aliphatic com-
pounds selected from vinyl laurate, vinyl stearate, vinyl
decanoate, and vinyl valerate.

13. The method of claim 1, wherein the bioplastic is
biodegradable, partially biodegradable, or non-biodegrad-
able in soil.

14. The method of claim 1, further comprising the step of
hydrolyzing the low quality cellulose biomass prior to the
step of dissolving the low quality cellulose biomass.

* * * * *